US011686149B2

(12) United States Patent
Farnes et al.

(10) Patent No.: US 11,686,149 B2
(45) Date of Patent: Jun. 27, 2023

(54) FENESTRATION ASSEMBLY AND BUILDING SERVICE CONTROL WITH THE SAME

(71) Applicant: Marvin Lumber and Cedar Company, Warroad, MN (US)

(72) Inventors: Brian Michael Farnes, Warroad, MN (US); Thomas James Hensrud, Apple Valley, MN (US); Gaetano Ling, Palo Alto, CA (US); Christopher Steven Hill, Burlingame, CA (US); Nikolaj Dam Roadley-Battin, San Francisco, CA (US)

(73) Assignee: MARVIN LUMBER AND CEDAR COMPANY, LLC, Eagan, MN (US)

( * ) Notice: Subject to any disclaimer, the term of this patent is extended or adjusted under 35 U.S.C. 154(b) by 875 days.

(21) Appl. No.: 16/540,933

(22) Filed: Aug. 14, 2019

(65) Prior Publication Data
US 2020/0056424 A1 Feb. 20, 2020

Related U.S. Application Data

(60) Provisional application No. 62/718,917, filed on Aug. 14, 2018.

(51) Int. Cl.
*E04D 13/03* (2006.01)
*E06B 9/52* (2006.01)
(Continued)

(52) U.S. Cl.
CPC ............ *E06B 7/10* (2013.01); *E04D 13/0325* (2013.01); *F21S 11/007* (2013.01); *E04D 13/031* (2013.01);
(Continued)

(58) Field of Classification Search
CPC .... F24F 7/02; E04D 13/0315; E04D 13/0325; E04D 13/033; E04D 13/035;
(Continued)

(56) References Cited

U.S. PATENT DOCUMENTS 1,022,870 A * 4/1912 Power ...................... E06B 7/26
D23/370
2,311,413 A * 2/1943 Persson ..................... E06B 9/54
160/94
(Continued)

FOREIGN PATENT DOCUMENTS

| EP | 2385184 A1 * | 11/2011 | ......... E04D 13/0358 |
|---|---|---|---|
| WO | 2013113987 | 8/2013 | |
| WO | 2014207349 | 12/2014 | |

OTHER PUBLICATIONS

"Canadian Application Serial No. 3,052,156, Response filed Apr. 22, 2022 to Office Action dated Dec. 22, 2021", 30 pgs.
(Continued)

*Primary Examiner* — Kyle J. Walraed-Sullivan
(74) *Attorney, Agent, or Firm* — Schwegman Lundberg & Woessner, P.A.

(57) ABSTRACT

A fenestration system includes one or more of a light modulation controller or ventilation modulation controller. The light modulation controller is in communication with at least one light modulation element of a fenestration assembly having a frame and a panel. The light modulation controller includes a light prescription module configured to provide a specified light prescription for the building interior. A lighting difference module is configured to determine a prescription difference between the specified light prescription and ambient light. A dynamic light module of the light modulation controller operates the at least one light modulation element according to the prescription difference. The ventilation modulation controller is in communication
(Continued)

with at least one operator configured to open and close the panel. A ventilation prescription module provides a specified ventilation prescription for the building interior, and a dynamic ventilation module implements panel closing and opening according to the specified ventilation prescription.

18 Claims, 16 Drawing Sheets

(51) Int. Cl.
    *E06B 7/10*     (2006.01)
    *F21S 11/00*     (2006.01)
    *E06B 9/24*     (2006.01)
    *E06B 3/50*     (2006.01)
    *E06B 9/26*     (2006.01)
    *E06B 1/52*     (2006.01)
    *E04D 13/035*     (2006.01)
    *E06B 1/36*     (2006.01)

(52) U.S. Cl.
    CPC .......... *E04D 13/033* (2013.01); *E04D 13/035* (2013.01); *E06B 1/36* (2013.01); *E06B 1/52* (2013.01); *E06B 3/5054* (2013.01); *E06B 9/26* (2013.01); *E06B 9/52* (2013.01); *E06B 2009/2417* (2013.01)

(58) Field of Classification Search
    CPC ... E04D 13/0354; E04D 13/0358; E06B 9/06; E06B 9/0669; E06B 9/0676; E06B 9/0692; E06B 2009/2625; E06B 2009/528; E06B 3/34; E06B 3/94; A01G 9/241
    USPC ........................................................ 454/119
    See application file for complete search history.

(56) References Cited

U.S. PATENT DOCUMENTS

| | | | |
|---|---|---|---|
| 2,701,515 A * | 2/1955 | Rinker | E06B 7/06 49/58 |
| 4,505,069 A | 3/1985 | Freeman | |
| 4,610,116 A | 9/1986 | Schulz | |
| 4,969,291 A * | 11/1990 | Camara | E06B 9/52 49/71 |
| 4,986,039 A | 1/1991 | Weisner | |
| 5,088,543 A | 2/1992 | Bilbrey | |
| 5,226,256 A | 7/1993 | Fries et al. | |
| 5,626,288 A | 5/1997 | Huber | |
| 5,694,996 A * | 12/1997 | Vigenberg | E06B 9/52 160/84.04 |
| 5,813,599 A | 9/1998 | Hoff | |
| 6,307,331 B1 | 10/2001 | Bonasia et al. | |
| 6,528,782 B1 | 3/2003 | Zhang et al. | |
| 6,699,120 B1 | 3/2004 | Darum | |
| 7,182,119 B2 | 2/2007 | Woodward et al. | |
| 7,743,814 B2 | 6/2010 | Woodward et al. | |
| 7,794,103 B2 | 9/2010 | Hoover | |
| 7,976,189 B2 | 7/2011 | Osborn | |
| 8,381,449 B1 | 2/2013 | Hodgetts et al. | |
| 8,569,977 B2 † | 10/2013 | Lanham | |
| 8,573,195 B2 | 11/2013 | Tinoco Cavalheiro et al. | |
| 8,726,586 B1 | 5/2014 | Stevens et al. | |
| 9,057,535 B2 | 6/2015 | Frazier et al. | |
| 9,360,731 B2 | 6/2016 | Berman et al. | |
| 9,574,747 B2 † | 2/2017 | Paolini | |
| 9,897,332 B2 | 2/2018 | Glover et al. | |
| 10,030,833 B2 † | 7/2018 | Adler | |
| 11,231,192 B1 | 1/2022 | Shah | |
| 2004/0256000 A1 | 12/2004 | Konstantin | |
| 2006/0185249 A1 * | 8/2006 | Whittlesea | E04D 13/0358 49/394 |
| 2007/0056579 A1 | 3/2007 | Straka et al. | |
| 2007/0072541 A1 | 3/2007 | Daniels et al. | |
| 2007/0163732 A1 | 7/2007 | Konstantin et al. | |
| 2008/0110110 A1 * | 5/2008 | Burton | E06B 1/6084 52/741.1 |
| 2008/0120930 A1 * | 5/2008 | Jacobsen | E04D 13/0354 160/90 |
| 2009/0046451 A1 | 2/2009 | Hoover | |
| 2009/0085497 A1 | 4/2009 | Osborn | |
| 2011/0039490 A1 | 2/2011 | Wiese | |
| 2011/0266971 A1 | 11/2011 | Osborn | |
| 2012/0011782 A1 | 1/2012 | Kolas et al. | |
| 2012/0247748 A1 | 10/2012 | Mise et al. | |
| 2014/0355098 A1 | 12/2014 | Berman et al. | |
| 2015/0219344 A1 | 8/2015 | Glover et al. | |
| 2016/0069579 A1 | 3/2016 | Yabunouchi et al. | |
| 2016/0295397 A1 | 10/2016 | Nielsen | |
| 2017/0275944 A1 * | 9/2017 | LaPlaca | E06B 7/03 |
| 2018/0124899 A1 | 5/2018 | Robinson et al. | |
| 2018/0163976 A1 | 6/2018 | Glover et al. | |
| 2019/0017319 A1 * | 1/2019 | Duffy | E05B 47/0004 |
| 2019/0309559 A1 | 10/2019 | Hall et al. | |
| 2020/0326086 A1 | 10/2020 | Hamada et al. | |
| 2021/0332641 A1 * | 10/2021 | LaPlaca | E06B 9/522 |
| 2022/0316265 A1 | 10/2022 | Farnes et al. | |

OTHER PUBLICATIONS

"Canadian Application Serial No. 3,052,156, Office Action dated Dec. 22, 2021", 4 pages.

"Canadian Application Serial No. 3,052,156, Office Action dated Aug. 11, 2022", 4 pgs.

"U.S. Appl. No. 17/808,742, Restriction Requirement dated Oct. 17, 2022", 8 pgs.

"U.S. Appl. No. 17/808,742, Response filed Dec. 1, 2022 to Restriction Requirement dated Oct. 17, 2022", 10 pgs.

"Canadian Application Serial No. 3,052,156, Response Filed Dec. 9, 2022 to Office Action dated Aug. 11, 2022", 17 pgs.

\* cited by examiner
† cited by third party

FENESTRATION ASSEMBLY AND BUILDING SERVICE CONTROL WITH THE SAME

PRIORITY APPLICATION

This application claims priority to U.S. Provisional Application Ser. No. 62/718,917, filed Aug. 14, 2018, the disclosure of which is incorporated herein in its entirety by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Marvin Lumber and Cedar Company d/b/a Marvin Windows and Doors of Warroad, Minn. All Rights Reserved.

TECHNICAL FIELD

This document pertains generally, but not by way of limitation, to fenestration assemblies and building services.

BACKGROUND

Fenestration assemblies including window and skylight assemblies provide daylight delivering elements to buildings. Window and skylight assemblies facilitate views from the exterior of a building (sky in the case of skylights) and the delivery of daylight to otherwise enclosed spaces. With skylight assemblies the roof is penetrated, and the assembly installed to provide daylight in a vertical manner to the enclosed spaces.

In other examples, fenestration assembles are operable to provide ventilation to the building. For instance, window assemblies include opening sashes that are slid within the frame or rotated relative to the frame to open the assemblies and provide ventilation. Operable skylights (e.g., capable of opening) are rotated relative to hinges interconnecting an end of the skylight sash to the frame to provide an ventilation along the bottom and sides of the skylight assembly.

Screens, such as interlaced metal wire screens, are included with fenestration assemblies to intercept and prevent the ingress of insects, debris, such as foliage, or the like. In single or double hung type window assemblies interlaced wire screens are provided across the frame opening and on the exterior of the frames between the sashes and the exterior environment. In casement window assemblies and operable skylight assemblies interlaced wire screens are installed on the interior side of frames and span the frame opening.

SUMMARY

The present inventors have recognized, among other things, that a problem to be solved includes minimizing the interruption of daylight by interposing features, such as screens, in fenestration assemblies while at the same time enhancing building services such as ventilation and lighting. Fenestration assemblies that provide ventilation include screens, such as interlaced wire screens, in the frame openings (e.g., the light shaft) to prevent the ingress of insects, debris or the like. The screens interrupt the delivery of daylight from the exterior to the interior space of a building.

Additionally, fenestration assemblies deliver daylight, not surprisingly, during daylight hours. Accordingly, where light is desired in evenings, for reading, work, entertainment or the like light fixtures are provided in the building to supply artificial light for these tasks or activities. In some examples, light sources such as fixtures are installed in ceilings, placed on tables, or floors and provide artificial lighting that is clearly not equivalent to daylight, for instance because of locations of light fixtures, visual indication of where light is coming from (e.g., a bulb, ceiling fixture, diffused fixture or shade), quality of the light or the like. In other examples, light delivered from building light sources is clearly artificial to occupants and accordingly provides an artificial (and less comfortable) sensation to a building occupant because of one or more of the visual indication of the light source or the consistency of light delivered from the light source. In contrast, daylight provided through fenestration assemblies varies based on a variety of factors including, but not limited to, weather, time of day, position of the sun, latitude of the building, seasonal variations (e.g., day and night periods) or the like. Daylight and variations in daylight provide a pleasing and comfortable experience to human beings whether noted consciously or subconsciously. Additionally, day and night periods including daylight and decreased or absent daylight provide natural cues to human beings that prompt wakefulness and activity (with daylight), and prompt relaxation and rest (with decreases in daylight and, conversely, increased darkness).

The present subject matter helps provide a solution to these problems, such as by a fenestration assembly including one or more light modulation features configured to provide simulated daylight or throttle the delivery of daylight. The fenestration assembly includes a fenestration frame and at least one translucent (e.g., transparent or translucent) panel coupled with the fenestration frame. Additionally, the fenestration assembly includes at least one light modulation element configured to modulate light (e.g., actual daylight, simulated daylight, combinations of the same or the like) from the fenestration assembly to a building interior. In various examples, the at least one light modulation element includes, but is not limited to, a light source, such as an array of LEDs, bulbs, elements or the like, operable shades, operable screens, operable blinds or operable louvers.

Further, the fenestration assembly includes a light modulation controller in communication with the at least one light modulation element. The light modulation controller is provided as a component in the fenestration assembly, in one or more systems associated with the assembly (e.g., thermostat, learning thermostat, programmable thermostat, smartphone, tablet, computer, home automation system or the like). The light modulation controller is configured to operate the at least one light modulation element to correspond with a specified light prescription stored or input from a light prescription module of the controller. The light prescription module of the light modulation controller implements one or more prescriptions based on one or more of daylight delivered through the assembly and light generated at the assembly (e.g., simulated daylight) and delivered therefrom. For instance, the light modulation controller in cooperation with the at least one light modulation element (e.g., a light source, shade, louvers or the like) controls one or more of the delivery of light to a building space, such as lumens or other light based characteristics, the orientation of delivered light, period of delivery (including beginning time, end time, and length of time) of light to the building space or the like.

In some examples, the light modulation controller includes a period module that provides a specified light admission period (e.g., a building occupant input period), for instance to provide a corresponding 'active' period for the occupant. A lighting difference module determines a period difference between the specified light admission period and a natural light period, for instance corresponding to dawn and dusk. A dynamic light module operates the at least one light modulation element according to the determined period difference. For example, the controller operates the at least one light modulation element, such as an array of LEDs, to gradually supplement decreasing daylight delivered through the assembly with increased brightness as dusk and full night approach. Conversely, in another example, the controller operates the light modulation element to gradually decrease supplemented light from the array of LEDs (decrease brightness) as dawn approaches and daylight increases. In other examples, the at least one light modulation element includes an operable shade, louvers or the like as described herein. The light modulation controller operates these elements to decrease daylight delivered through the assembly, for instance if mid-day rest is desired, a child is napping, the building is located at a relatively high latitude and receives daylight early and late in the evening, or the like.

In other examples, the light modulation controller includes an orientation module (e.g., optionally as part of a light prescription module) configured to control one or more of the delivery direction, delivery location or the like of light from the fenestration assembly. For instance, in examples including fenestration assemblies such as skylights and southern facing windows in the northern hemisphere the sun transits across the sky, and accordingly provides a varied orientation of delivered light corresponding to the transit. In one example, the orientation module gradually increases lighting (including supplemental lighting, dimming through use of a shade or the like) in a first portion or zone of the fenestration assembly while maintaining, increasing or decreasing lighting in a second portion or zone of the assembly corresponding to the transit of the sun. In other examples, one or more of the at least one light modulation elements are moved (rotated, translated or the like) to provide directed light corresponding to the transit of the sun. Accordingly, the at least one light modulation element is operated in a manner that duplicates the transit of the sun during a day, and thereby provides a natural experience to occupants corresponding to a specified day.

In still other examples, the light modulation controller including the modules described herein selectively modulates (e.g., maintains, adjusts, decreases, increases or the like) light delivered from the fenestration assembly to correspond with one or more of weather, seasonal or latitude based characteristics. Brightness, orientation of light or the like from the fenestration assembly including light generated at the assembly, light delivered through the assembly (daylight) are modulated to, for example, correspond with cloudy or partly cloudy conditions on an otherwise sunny day or increase or decrease light delivered according to the season or latitude to virtually lengthen shorter days in winter or shorten longer days in the summer. The light modulation controller is further configured to modulate light delivered from the fenestration assembly to account for latitude based characteristics including, but not limited to, longer days proximate the equator or at higher latitudes during the summer, and shorter days during the winter or at higher latitudes.

Additionally, fenestration assemblies described herein are in some examples operable (configured to open and close) to provide ventilation, and include screen assemblies that are misaligned to the respective panels (e.g., one or more glazing units). Further, as described above, the delivered light, light modulation or the like are also features of the fenestration assemblies. With the screen assemblies described herein the delivered light is not interfered with (e.g., intercepted, undesirably diffused or the like) by a screen.

One example of a screen assembly used with the fenestration assemblies includes a pliable screen membrane and one or more pleating guides coupled with the pliable screen membranes. In one example, the pliable screen membrane is coupled between the fenestration frame and the translucent panel, and accordingly does not extend across the translucent panel or the light shaft that delivers light from the fenestration assembly to the building interior. Light delivered through the fenestration assembly is not intercepted and is instead delivered to the building space in an uninterrupted manner.

As the fenestration assembly is opened the pliable screen membrane deploys and spreads across the ventilation gap between the panel and the frame. In one example, the pliable screen membrane transitions from a stored configuration (with the membrane pleated) with the fenestration assembly closed to a deployed configuration with the fenestration assembly open. When the fenestration assembly is closed the pleating guides bias the pliable screen membrane to pleat (e.g., fold, crease, compress, stack or the like) between the translucent panel and the fenestration frame. Accordingly the pliable screen membrane is undamaged, readily stored, and ready for deployment in the future.

In an example, a pleated guide includes a corrugated strut having a plurality of arms interposed between deformable peaks and troughs. As the translucent panel is closed the arms gradually rotate toward each other as the peaks and troughs guide the rotation. Gaps between the arms are closed. The pliable screen membrane is coupled along the arms and is biased by the corrugated strut (with movement of the arms) to follow the closing motion. The pliable screen membrane assumes a pleated configuration according to the guiding bias provided by the corrugated strut.

In other examples, the fenestration assemblies described herein include telescoping screen assemblies including one or more rigid or semi-rigid screen panels that telescope relative to one or both of the fenestration frame or the translucent panel. The screen panels, in the stored configuration, stack with one or more of each other, the fenestration frame or the translucent panel or the like with the fenestration assembly closed. Opening of the translucent panel translates the screen panels with movement of the translucent panel. For example, the screen panels are coupled with the translucent panel and telescope relative to the fenestration frame with opening (e.g., the screen panels are in the deployed configuration). In another example, the screen panels are coupled with the fenestration frame, and the translucent panel telescopes relative to the frame and the screen panels. In still other examples, the screen assemblies include screen panels wound around one or more screen spools (in the stored configuration), and opening of the translucent panel unrolls the screen panels from the screen spools between the fenestration frame and the open translucent panel in the deployed configuration.

In still other examples, the fenestration assemblies include ventilation controllers. In a similar manner to the light modulation controllers described herein, the ventilation controllers are in some examples provided as components in fenestration assemblies, in one or more systems associated with the assemblies (e.g., thermostat, learning thermostat, programmable thermostat, smartphone, tablet, computer, home automation system or the like). The ventilation controller is configured to move the translucent panel between open and closed positions. For instance, with input from an occupant the ventilation controller opens the fenestration assembly. Optionally, the ventilation controller cooperates with other fenestration assemblies or ventilation devices, such as fans, blowers, furnaces, HVAC units, heat pumps, air exchangers or the like. For example, the ventilation controller opens the translucent panel of the fenestration assembly when another fenestration assembly is opened to promote circulation through the building. In another example, the ventilation controller opens the translucent panel during operation of an air exchanger to promote air exchange between interior and exterior environments.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
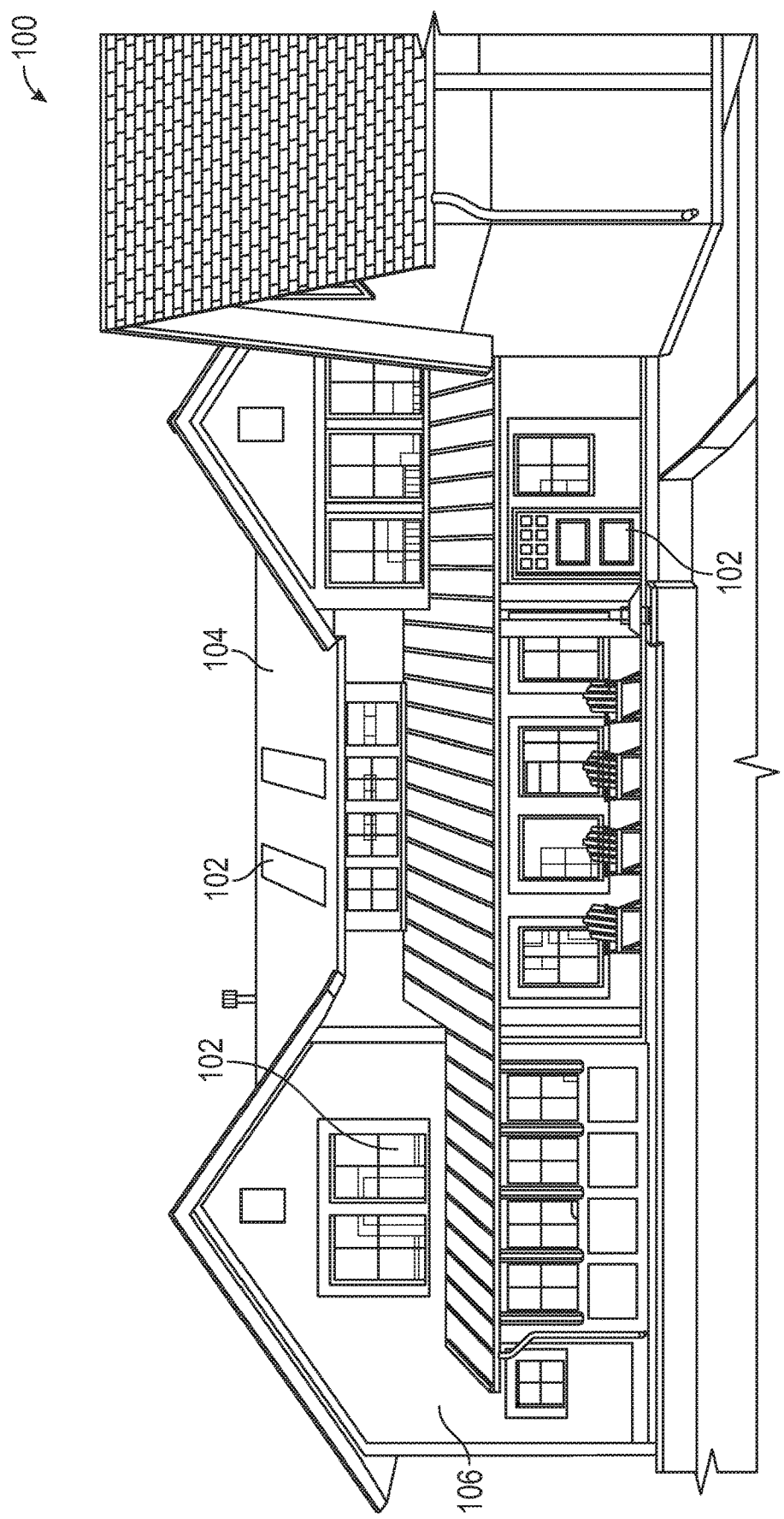
FIG. 1 is a perspective view of an example building including multiple fenestration assemblies.

FIG. 1 is a schematic view of one example of a building 100. The building 100 includes one or more of a commercial, residential, municipal or other building such as an office building, warehouse, storage faciliyts or the like. The building 100 includes a building upper portion 104, such as a (flat or sloped) roof, awning or the like and one or more building walls 106. As shown in FIG. 1, the building 100 includes one or more fenestration assemblies 102 provided on one or more of the building upper portion 104 and the building walls 106. For instance, as shown in FIG. 1, one or more skylight fenestration assemblies 102 are provided along the building upper portion 104. As described herein, the fenestration assemblies 102 corresponding to the skylights shown in FIG. 1 are operable, for instance remotely operable or automatically operable, to accordingly provide modulated control of various services or features including lighting and ventilation to the interior of the building 100.

In other examples, the fenestration assemblies 102 described herein and shown, for instance, in FIG. 1, include one or more of windows, doors or the like. As shown, the fenestration assemblies 102 include, but are not limited to, one or more of double hung, casement, awning or other windows installed in the building walls 106. Additionally, the fenestration assemblies 102 include a door including, but not limited to, sliding doors, swinging doors or the like. As provided herein, a reference to a skylight or window should not be considered an exclusive reference and may refer to one of the alternative fenestration assemblies (e.g., windows, doors, skylights or one or more of the same) described herein. In each of the examples described herein, the fenestration assemblies 102 include a panel, such as a translucent panel, opaque panel (for instance with a door) and a surrounding fenestration frame. The panels described herein, such as translucent panels of the fenestration assemblies 102 are configured to translate relative to the fenestration frame and accordingly provide a continuous ventilation perimeter opening around the fenestration assembly 102 to facilitate ventilation into and out of the building 100. In other examples described herein, the fenestration assemblies 102 including, for instance, the skylight fenestration assemblies or other example fenestration assemblies previously described herein include one or more light modulating elements including, but not limited to, light arrays, shades or the like configured to supplement or throttle light delivered through or from the fenestration assemblies into the interior of the building 100. As described herein, one or more building systems including, for instance, one or more of light modulating or ventilation modulating building systems are described that are configured to control one or more of light or ventilation through the one or more fenestration assemblies 102, for instance, in coordination with one or more other features of the building 100 including, but not limited to, environmental conditioning units, additional or supplemental fenestration assemblies or the like.

Figure 2:
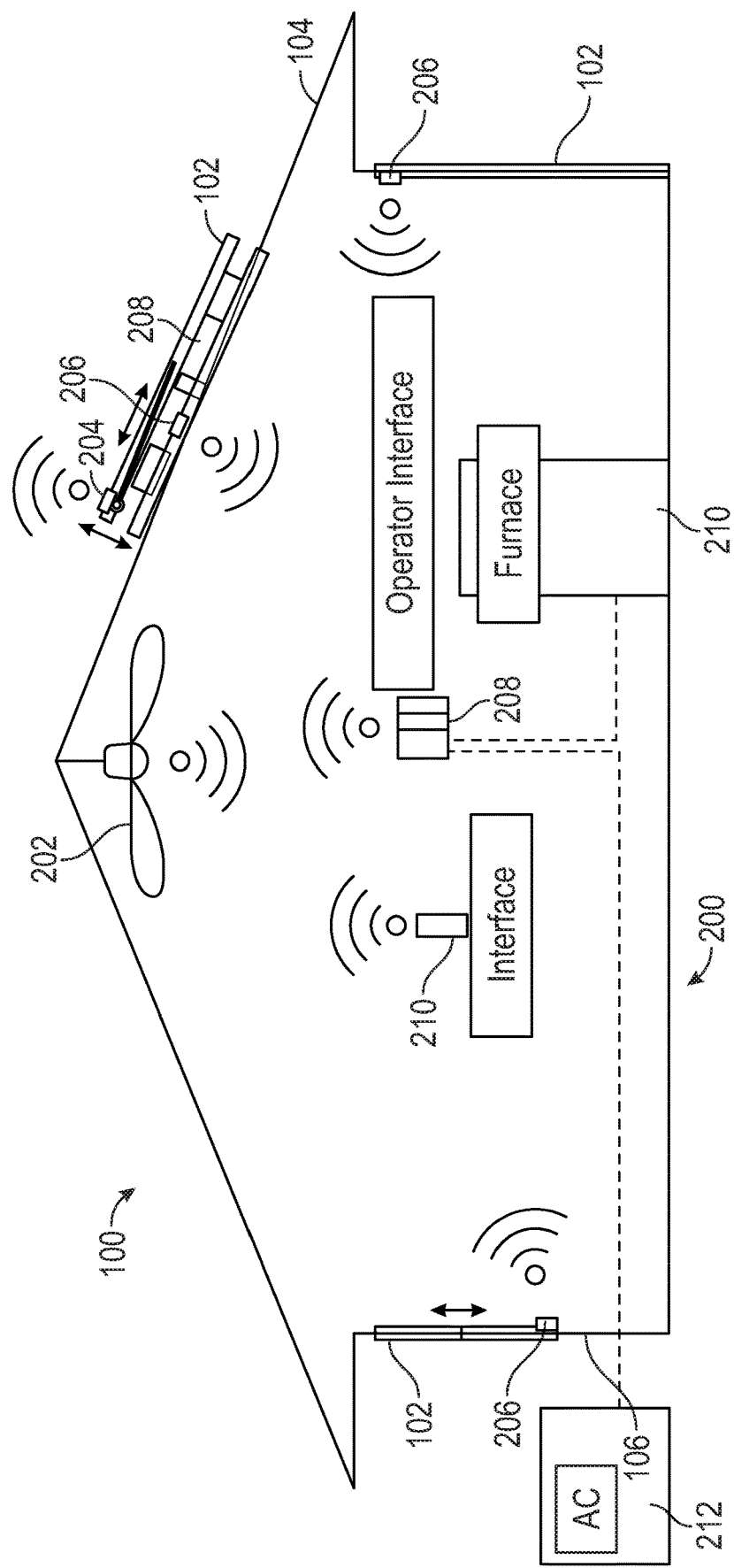
FIG. 2 is a schematic view of a building including an example building service control system.

FIG. 2 is another schematic representation of a building such as the building 100. As shown in FIG. 2, one example of a building services system 200 is shown. In this example, the building services system 200 includes one or more light modulating fenestration systems or ventilation modulating fenestration systems. Each of these systems are described in detail herein.

Referring again to FIG. 2, a plurality of fenestration assemblies 102 are installed in the building 100. For instance, one example of the fenestration assembly 102 including, for instance, an operable skylight, is provided along the roofline or upper portion 104 of the building 100. Additionally, a door type fenestration assembly 102 is shown at the right of the figure while a window type fenestration assembly 102, such as a double hung window including one or more operable sashes, is shown in the left portion of FIG. 2.

As shown in FIG. 2, each of the fenestration assemblies 102 optionally includes one or more sensor assemblies. For instance, in the fenestration assembly 102 corresponding to the skylight in FIG. 2, an interior sensor assembly 206 is provided with the fenestration assembly 102. The interior sensor assembly 206 includes, but is not limited to, one or more sensors configured to measure light characteristics of ambient light such as brightness (intensity), temperature (color) or the like. In other examples, the interior sensor assembly 206 is configured to measure or determine one or more of an opened or closed status of the fenestration assembly such as the translucent panel, a degree of opening or closing of the translucent panel or the like. Optionally, the interior sensor assembly 206 includes one or more of a building sensor, security system or the like configured to monitor the opening or closing of entrances and exits (e.g., buildings, doors, skylights or the like). In still other examples, the interior sensor assembly 206 measures one or more of temperature (e.g., proximate to the interior of the fenestration assembly 102 and proximate to the roof, crawl space or the like), humidity, airflow through the fenestration assembly 102 or the like.

In another example, the interior sensor assembly 206 includes one or more of a transmitter or transceiver. In an example including a transmitter or a transceiver, the interior sensor assembly 206 is configured to provide one or more of the detected characteristics such as light characteristics, environmental characteristics, operation characteristics or the like associated with the fenestration assembly 102 and the interior of the building 100 to one or more other features of the building services system 200 including, but not limited to, light or ventilation modulating controllers, a system interface 210, an operator interface 208 and one or more other components of the building services system 200 including, but not limited to, one or more environmental conditioning units 210, 212, a fan 202 and one or more of the other fenestration assemblies 102.

As further shown in FIG. 2, an exterior sensor assembly 204 is, in one example, provided with a fenestration assembly 102, such as the assembly installed along the building upper portion 104. In various examples, the exterior sensor assembly 204 detects, measures or determines one or more of light characteristics including ambient light (including daylight brightness, temperature), temperature, humidity, pressure, wind speed, wind direction, air quality, moisture (e.g., rain or snow) of the exterior environment surrounding the building 100 or airflow through the assembly. As with the interior sensor assembly 206, the exterior sensor assembly 204 is optionally configured to include a dedicated transmitter or transceiver configured to accordingly transmit one or more of the detected or determined characteristics to one or more other components of the building services system 200 including, for instance, light or ventilation modulating controllers, the system interface 210, the operator interface 208 or the like. In other examples, the fenestration assemblies 102 include controllers (such as the light or ventilation modulating controllers described herein) and the sensor assemblies are hardwired or wirelessly connected with the onboard controllers.

As described herein, one or more of these components such as the interface 208 or system interface 210 (in addition to or alternatively to the fenestration assemblies 102) includes one or more modulating controllers or modules including, for instance, circuits, computer readable media, programmed logic controllers or the like configured to operate the fenestration assemblies 102 or control operation of features of the fenestration assemblies 102 according to the detected or determined characteristics including, for instance, environmental characteristics determined or detected with the exterior and interior sensor assemblies 204, 206 (and as described herein light or ventilation prescriptions including operator inputs, control schemes or the like).

As also shown in FIG. 2, the fenestration assembly 102 along the building upper portion 104 such as a roof, awning or the like includes a panel operator 208. As described herein, the panel operator 208 (or operator) is configured to move one or more components of the fenestration assembly 102 including, for instance, a panel to accordingly facilitate ventilation through the fenestration assembly 102 into the building 100.

As further shown in FIG. 2, each of the fenestration assemblies 102 including, for instance, the window shown on the left side of the building 100 and the door shown on the right side of the building optionally include interior sensor assemblies 206 of their own. In one example, the interior sensor assemblies are configured to measure or detect one or more of an open or closed status of the respective fenestration assembly, one or more light characteristics including ambient light proximate to the respective fenestration assemblies, airflow through the fenestration assemblies or the like. As with the previously described fenestration assembly 102, such as the skylight fenestration assembly shown in FIG. 2, each of the fenestration assemblies 102 shown in FIG. 2 including the door and the window, in one example, include transmitters or transceivers configured to provide one or more of their status or other measured or detected characteristics to one or more other features of the building services system 200.

Referring again to FIG. 2, the building system 200, in other examples, includes one or more other components including, but not limited to, environmental conditioning units such as a fan 202 and environmental conditioning units 210, 212. In one example, the environmental conditioning unit 210 includes one or more of a furnace, air exchanger, heat pump, geothermal unit or the like. Additionally, another example of an environmental conditioning unit 212 is shown on the exterior of the building 100 in communication with one or more interior components of the building 100. The environmental conditioning unit 212, in one example, corresponds to an air conditioning unit, a heat pump, geothermal unit or the like.

As further shown in FIG. 2, the building services system 200 includes one or more interfaces. For instance, a system interface 210 includes one or more of a bus, hardwiring (an Ethernet network) or wireless network to intercommunicate or interconnect the one or more components of the building services system 200 including, for instance, one or more of the fenestration assemblies 102, the environmental conditioning units 202, 210, 212 as well as one or more other components of the building services system 200. In another example, the system interface 210 communicates with a portable controller such as an app based controller, tablet, smartphone or the like. Optionally, the controller for the system is housed within an operator interface 208 in contrast to a portable tablet, smartphone or the like. The operator interface 208, whether installed in the building 100 or provided on one or more application based devices such as a tablet, smartphone or the like, includes one or more modules, circuits, computer readable medium or the like configured to provide the functions of a thermostat, ventilation modulation controller or light modulation controller (if not present with the fenestration assemblies), coordination of the operation of the various fenestration assemblies 102 and optionally one or more of the environmental conditioning units or the like. In one example, as described herein, the operator interface 208, in one example, is a home automation controller and interacts with one or more of the fenestration assemblies 102 and one or more of the environmental conditioning units 210 to coordinate their operation and function. In one example, the operator interface 208 includes an onboard system interface 210 including, for instance, a wireless modem, switch or the like. In another example, the operator interface communicates with the one or more components of the building services system 200 through the system interface 210 used as an intermediate (e.g., a wireless modem).

Figure 3A:
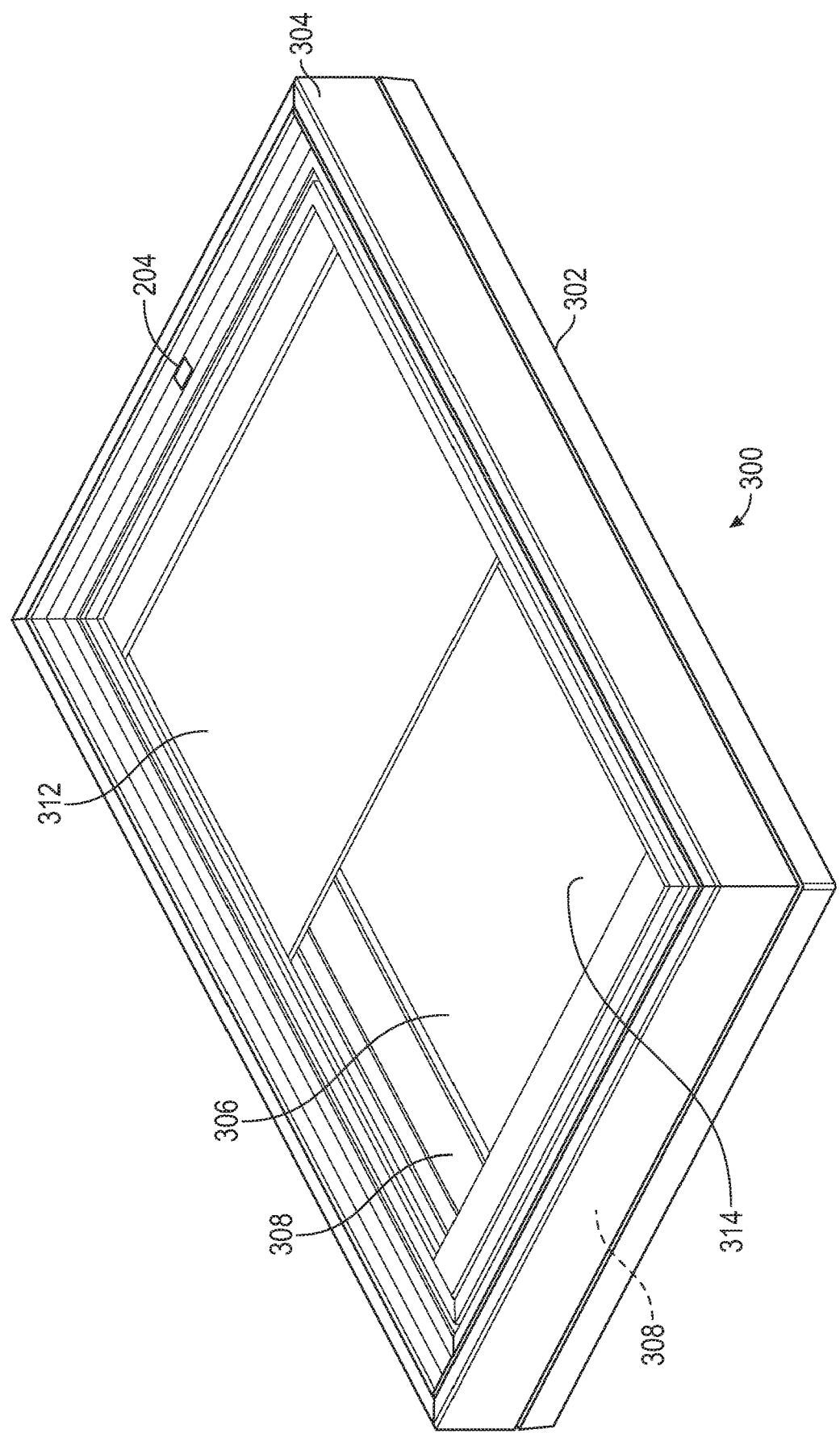
FIG. 3A is a perspective view of an example fenestration assembly in a closed configuration.
Figure 3B:
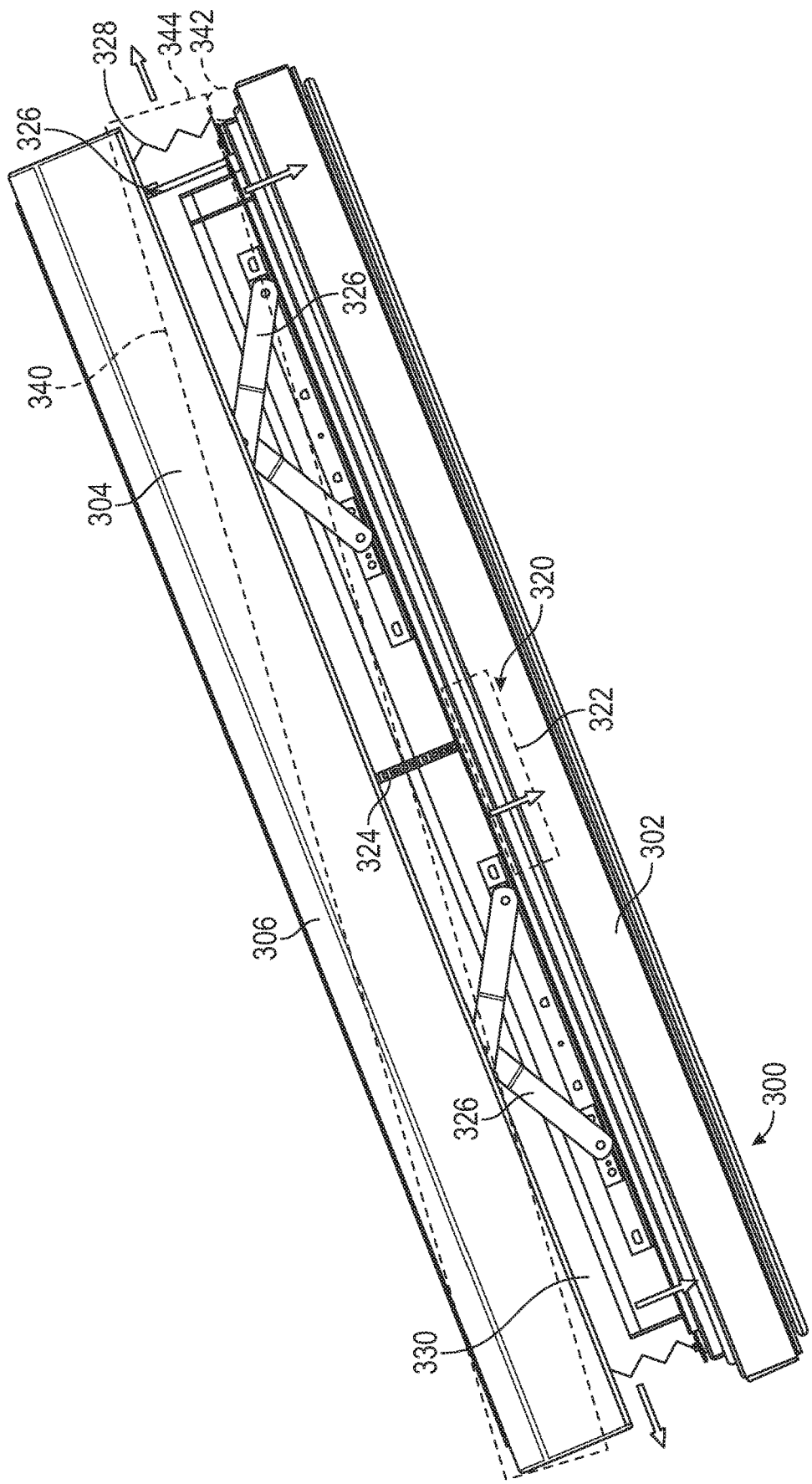
FIG. 3B is a side view of the fenestration assembly of FIG. 3A in an open configuration.
Figure 3C:
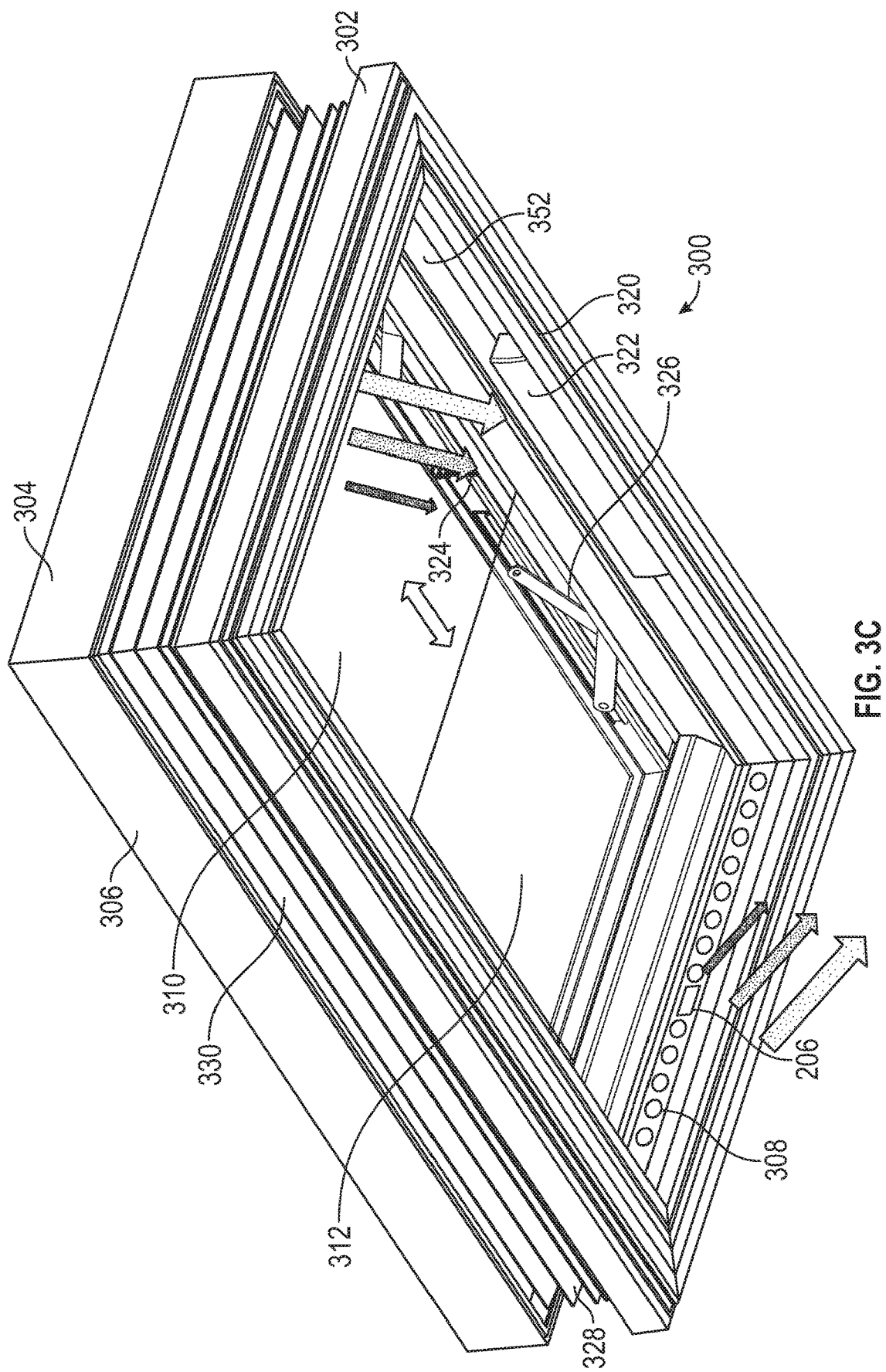
FIG. 3C is a lower perspective view of the fenestration assembly of FIG. 3A including example light modulating elements.

FIGS. 3A, 3B and 3C show various views of a fenestration assembly 300.

In one example, the fenestration assembly 300 corresponds to a skylight assembly, for instance, the fenestration assembly 102 shown in FIGS. 1 and 2 and associated with the building upper portion 104. Referring first to FIG. 3A, the fenestration assembly 300 is shown in a closed position with a panel 306, such as a translucent panel, opaque panel or the like, closed position relative to a fenestration frame 302. As further shown in FIG. 3A, in one example, the panel 306 includes a peripheral frame 304 surrounding a pane 314 (e.g., a glazing unit, insulated glazing unit (IGU) or the like). As described herein, the panel 306 is configured to move relative to the fenestration frame 302, for instance, in a projecting manner to accordingly provide a continuous venting perimeter around the panel 306 to thereby facilitate ventilation through the fenestration assembly 300 to and from the building interior.

As shown in FIG. 3A, the fenestration assembly 300 includes one or more light modulating elements. For instance, the fenestration assembly 300 includes a light array 308, as an example, light modulating element. The light array 308 is, in various examples, installed along one or more components of the fenestration frame 302. In the example shown in FIG. 3A, the light array 308 extends along one or more of the sill jamb, header jamb, side jambss or the like of the fenestration frame 302. As described herein, the light array 308 is, in one example, configured to supplement ambient light including one or more of adding additional light to ambient (daylight or interior light) to accordingly achieve or satisfy a specified light prescription associated with the building system such as the building services system 200 including, for instance, a light modulating fenestration system. For instance, the fenestration assembly 300 is in communication with or includes a light modulation controller configured to modulate (e.g., control, vary, maintain or the like) light generated by the light array 308 to supplement light delivered through the fenestration assembly 300, such as daylight, for instance, into the interior of the building. In another example, the light modulation controller operates the light array 308 in a manner configured to provide orientation or a virtual orientation of light through the fenestration assembly 300 to, for example, emulate or simulate a virtual day/night cycle including, for instance, the transit of the sun relative to the fenestration assembly 300 and the building. In still other examples, supplemental light provided by the light array 308 includes light generated as the sole source of light to the building interior (e.g., to provide light from the fenestration assembly only in contrast to other light sources such as lamps, fixtures or the like).

In another example, the fenestration assembly 300 includes an operable shade 312 configured to transition from an open to a closed configuration. The operable shade 312 is another example of a light modulating element configured to throttle light delivered through the fenestration assembly. In the example shown in FIG. 3A, the operable shade 312 is in an intermediate configuration, for instance, between closed and open positions. The operable shade 312 is optionally stored in and deployed from a spool, for instance, associated with one or more of the header or sill of the fenestration assembly 300.

The operable shade 312 includes, but is not limited to, one or more of a shade assembly, screen assembly, louvers or the like including one or more dimming or light blocking elements. In another example, the operable shade 312 includes a plurality of operable shades 312 configured to move in cooperation, for instance, with one operable shade moving over top of or relative to another operable shade. In another example, the operable shades 312 include one or more diffusing qualities or characteristics and accordingly stacking and moving the one or more operable shades 312 over top of one another varies diffusion, filtering or throttling of light through the fenestration assembly 300 to the interior of the building in a graduated manner (e.g., to achieve a specified brightness, temperature or both).

As further shown in FIG. 3A, the fenestration assembly 300, in another example, includes a pane 314. Optionally, the pane 314 includes operable tinting, for instance, an electrically operable tinting. In a similar manner to the operable shade 312, the electrically operable tinting is one example of a light modulating element configured to throttle light. Accordingly, with the fenestration assembly 300 including, for instance, the light arrays 308 and one or more of the operable shades 312, electrically operable tinting or the like, the fenestration assembly 300 is configured to modulate light through the fenestration assembly 300 as well as generated by the fenestration assembly 300 (both dimming and supplementing) to thereby control delivery of light from the fenestration assembly 300 into the building. As described herein, a light modulation controller is in communication with the fenestration assembly 300 and operates the one or more light modulating elements to control light delivered from the fenestration assembly 300 including one or more of supplementing, throttling or the like to satisfy one or more specified light prescriptions including, but not limited to, operator inputs, ongoing schemes for light delivery or the like.

As further shown in FIG. 3A, an exterior sensor assembly 204 (previously shown in FIG. 2) is provided with the example fenestration assembly 300 along one or more of the header, sill or the like. In this example, the exterior sensor assembly 204 is associated with the fenestration frame 302 and is exposed through the translucent panel 306. The exterior sensor assembly 204 is configured to detect, determine or measure one or more environmental characteristics including, but not limited to, ambient light characteristics such as daylight temperature (color), daylight brightness (intensity), humidity, pressure, wind speed, wind direction, air quality, airflow (volumetric flow through the assembly) or the like. As previously described, the exterior sensor assembly 204, in one example, optionally includes a transmitter or transceiver configured to provide determined or detected characteristics from the exterior sensor assembly 204 to one or more other components of the building services system 200 including, for instance, the light or ventilation modulating fenestration systems described herein. In another example, the exterior sensor assembly 204 is in communication with other components of the fenestration assembly 300, for instance, one or more of the light modulation controller, ventilation modulation controller or the like associated with the fenestration assembly 300 (e.g., coupled with the assembly or remote and in communication). In one example, the exterior sensor assembly 204 (as well as the interior sensor assembly 206 where present) are electrically coupled or wirelessly coupled with one or more program logic controllers (PLC), processors or the like installed in the fenestration frame 302. Optionally, these features (PLC, processor or the like) include the light modulation controller including one or more of the modules described further herein.

FIG. 3B shows a side view of the fenestration assembly 300 previously shown in FIG. 3A. In this example, the fenestration assembly 300 is in an open configuration with the panel 306 in an open position. The panel 306 is projected away from the fenestration frame 302 with a continuous ventilation perimeter 330 extending around the fenestration assembly 300 and interposed between the open panel 306 and the fenestration frame 302.

An operator 320 coupled with the fenestration assembly 300 is configured to move the panel 306 between the closed and open positions (and optionally intermediate positions therebetween). The operator 320, in an examples, includes an operator actuator 322 such as an electric motor, hydraulic motor or the like installed in the assembly. The operator 320 includes an operator mechanism 324 coupled between the panel 306 (e.g., the peripheral frame 304) and the fenestration frame 302. The operator mechanism 324, in one example, includes, but is not limited to, a three bar system, four bar system, screw drive, chain drive or the like configured to accordingly move the panel 306 relative to the fenestration frame 302. In the example shown in FIG. 3B the operator mechanism 324 includes a chain drive.

Optionally, the operator 320 includes one or more guide linkages 326 coupled with the fenestration assembly 300. In this example, guide linkages 326 are provided along one or more of the side jambs of the fenestration assembly 300 and optionally along the header jamb of the fenestration assembly. As described herein, the guide linkages 326 guide opening and closing movement of the panel 306 relative to the fenestration frame 302. For instance, the guide linkages 326 maintain the panel 306 in a parallel configuration (including proximate to parallel) relative to the fenestration frame 302 while moving between the closed and open positions. Accordingly, in one example, the operator 320 including the operator mechanism 324 and optionally the guide linkages 326 projects the panel 306 away from the fenestration frame 302 and facilitates the maintenance of a continuous ventilation perimeter extending along each of the sides of the fenestration assembly 300.

As further shown in FIG. 3B, another example of a panel such as a hinged panel 340 is shown in dashed lines relative to the panel 306. In the alternative example, the hinged panel 340 is coupled with the fenestration frame 302 with an intervening pivoting hinge 342. The hinged panel 340 accordingly pivots or rotates relative to the fenestration frame 302 into the open position shown in dashed lines in FIG. 3B. The hinged panel 340 includes a corresponding closed end 344 that closes a portion of the perimeter of the fenestration assembly in contrast to the fenestration assembly 300 having a continuous ventilation perimeter 330 as shown in FIG. 3B. In one example, the closed end 344 of the hinged panel 340 traps air within the interior of a building and throttles or minimizes ventilation through the fenestration assembly. Accordingly, the fenestration assembly having the hinged panel 340 has a decreased ventilation flow rate and, in some examples, throttles the exchange of heat between the building and the exterior environment around the building. Instead, heated air is, in one example, trapped along the hinged panel 340, for instance, adjacent to the closed end 344 and is not otherwise exhausted from the fenestration assembly.

In contrast, the fenestration assembly 300 includes the panel 306 having the continuous ventilation perimeter 330. The continuous ventilation perimeter shown in FIG. 3B facilitates ventilation along each sides of the fenestration assembly 300 without the closed end 344 associated with the hinged panel 340. The schematic arrows provided in FIG. 3B illustrate ventilation is along each side of the fenestration assembly 300 without throttled air flow or trapped hot air, for instance, along a closed end. Instead, air is readily ventilated to and from a building through the fenestration assembly 300 with the continuous ventilation perimeter 330 provided between the panel 306 and the fenestration frame 302.

As further shown in FIG. 3B, one example of a concealed screen assembly 328 is coupled between the panel 306 and the fenestration frame 302. The concealed screen assembly 328 spans the continuous ventilation perimeter 330 and prevents the ingress of particulate matter, debris, insects or the like through the fenestration assembly 300. The concealed screen assembly 328 is porous, and in some examples pliable. For instance the concealed screen assembly 328 includes a screen membrane having, but not limited to, fabrics, mesh, wire filaments, polymer filaments or the like configured to deflect with opening and closing movement of the panel 306. Optionally, the concealed screen assembly 328 is configured to pleat, fold, telescope or the like with opening and closing of the vent of the panel 306 relative to the fenestration frame 302. In an example including a telescoping screen the screen membrane is coupled with one of the fenestration frame 302 or the panel 306, and an opposed end of the screen membrane slides along a corresponding portion of the other of the panel 306 or the frame 302.

The concealed screen assembly 328 is, in one example, concealed between the panel 306 and the fenestration frame 302 with the panel 306 in the open or closed position. For instance, the concealed screen assembly 328 including a screen membrane or the like extends between and is coincident with the fenestration frame 302 and the peripheral portions of the panel 306 including the peripheral frame 304. Accordingly, the concealed screen assembly 328 is misaligned with a light shaft or daylight opening through the fenestration assembly 300. Instead, the light shaft or daylight opening is unobstructed and without intervening components including a screen assembly spanning the opening.

FIG. 3C shows another (lower perspective) view of the fenestration assembly 300 in the open position. As shown, the panel 306 is open relative to the fenestration frame 302 with the intervening continuous ventilation perimeter provided therebetween. The operator 320 (see FIG. 3B) moves the panel 306 to the open position. As further shown in FIG. 3C, the concealed screen assembly 328 is interposed between each of the panel 306 and the fenestration frame 302. The concealed screen assembly 328 is misaligned with the daylight opening to accordingly maintain an unobstructed view and facilitate the delivery of ambient light, such as daylight, through the fenestration assembly 300. In a similar manner, the guide linkages 326 as well as the operator mechanism 324 of the operator 320 are misaligned relative to the daylight opening to maximize daylight (and improve the view) through the fenestration assembly 300.

As further shown in FIG. 3C, the fenestration frame 302 optionally includes one or more module sockets 352 provided with one or more of the members of the fenestration frame 302 (and optionally the peripheral frame 304 of the panel 306). As shown in FIG. 3C, a cover of the module socket 352 is removed to illustrate the reception of the operator 320 in the module socket 352. In this example, the operator actuator 322 and the operator mechanism 324 (prior to opening of the panel 306) are installed and retained in the module socket 352. In other examples, one or more other features configured to provide additional services with the fenestration assembly 300 are installed in the module socket 352. These services and corresponding service modules include, but are not limited to, lighting, shades such as the operable shade 312, fenestration sensors (e.g., the interior or exterior sensor assemblies 206, 204), controllers for the light or ventilation modulating systems or the like. In the example provided in FIG. 3C, the light arrays 308 are installed in sill and header portions of the fenestration frame 302, for instance in corresponding module sockets 352.

As further shown in FIG. 3C, the light array 308 (an example light modulating element) is installed in a corresponding module socket 352 provided in the fenestration frame 302. In the example shown in FIG. 3C, the light array 308 includes light generating elements such as, but not limited to, LEDs, bulbs, strips, bars or the like. Additionally, the light array 308 optionally includes one or more diffusers, filters or the like configured to provide one or more of a specified light temperature, diffusion characteristic or the like.

Optionally, the interior sensor assembly 206, previously shown in FIG. 2, is provided with the light array 308. The interior sensor assembly 206 is configured to measure or determine one or more ambient light characteristics including, but not limited to, interior light intensity (brightness), interior light temperature (color) daylight intensity (measured through panel 306 of the assembly 300), daylight or the like. In other examples, the interior sensor assembly 206 is configured to monitor, detect or determine one or more additional environmental characteristics including, but not limited to, the open or closed status of the fenestration assembly 300 (intermediate open positions), temperature proximate to the fenestration assembly 300, humidity, airflow (e.g., volumetric airflow through the assembly) or the like. In still other examples, the interior sensor assembly 206 or another component of the light array 308 includes a transmitter or transceiver configured to provide the determined or measured characteristics from the interior sensor assembly 206 to one or more other components of the light modulation fenestration systems or ventilation modulating fenestration systems described herein.

As further shown in FIG. 3C, the light modulation elements (light arrays 308) are configured to generate supplemental light from the fenestration assembly 300 in a similar manner to delivery of daylight through the fenestration assembly 300. Supplemental light provided by the light arrays 308, in one example, corresponds to supplemental light used in combination with daylight to accordingly provide artificial or virtual daylight with actual daylight from the fenestration assembly 300. In other examples, the supplemental light delivered by the light array 308 includes generated light, for instance during the evening or night periods without daylight. The supplemental light generated with the light arrays 308 in this example simulates daylight or provides a specified light (e.g., intensity, temperature or the like) in the building interior from the fenestration assembly 300.

As shown with stippled arrows proximate to the light arrays 308 (one of the arrays is hidden by the intervening fenestration frame 302) the light arrays 308 are, in one example, configured to provide one or more graduations of light including one or more light intensities, light temperatures or the like. As described herein, the light array 308 as a light modulation element is, in one example, in communication with one or more other features of the light modulating fenestration system including, for instance, the interior sensor assembly 206, the exterior light assembly 204 and the light modulation controller. In one example, the interior sensor assembly 206 or other sensor assembly configured to measure interior ambient light measures ambient light, for instance, light conditions within a building or zone having the sensor assembly. The light modulation controller (described herein) uses the detected ambient light (including one or more of intensity, temperature or the like) and implements the provision of supplemental light with the light array 308. The supplemental light elevates one or more of light intensity or light temperature in the measured building or zone to achieve a specified light prescription (e.g., specified intensity, temperature or the like). In some examples the supplemental light combines with measured ambient light (e.g., daylight within the building, light provided by fixtures or lamps or the like) to achieve the specified light prescription. In other examples, the supplemental light achieves the specified light prescription itself, for instance in a dark home, during the night or the like. The light generated by the light arrays 308 is provided from the fenestration assembly 300 in a manner similar to daylight shining through a window. Accordingly, the fenestration assembly 300 (or assemblies 102 described herein), including the light arrays 308, provides virtual daylight configured to simulate daylight conditions including one or more of dawn, mid-day, dusk, other operator specified intensities, temperatures or the like.

FIG. 3C further shows the operable shade 312 in a partially deployed configuration, for instance, extending across a portion of the panel 306. As previously described, the operable shade 312 is another example of a light modulating element including, for instance, a light throttling element. The operable shade 312 is, in one example, operated in a similar (though converse) method to the light arrays 308. For instance, the interior sensor assembly 206 measures one or more ambient light characteristics including intensity, temperature or the like and the operable shade 312 is actuated by the light modulation controller (described herein) to accordingly dim or throttle daylight delivered through the fenestration assembly 300 to achieve a specified light prescription.

For instance, on a bright day where the operator desires daylight in a living space while at the same time wishing to minimize the daylight intensity (e.g., for eye comfort) the light modulation controller transitions the operable shade 312 to at least partially extend across the panel 306 and accordingly modulate (in this example, minimize) daylight (in this example, ambient light) delivered through the fenestration assembly 300. In a similar manner to the light arrays 308, the operable shade 312 is, in one example, operated in a graduated fashion. For example, the operable shade 312 is transitioned between closed and fully open positions (including intermediate positions) to modulate (e.g., control or tune) the daylight admitted through the fenestration assembly 300. In one example, the operable shade 312 cooperates with the interior sensor assembly 206 configured to measure one or more ambient light characteristics such as intensity, temperature or the like. The light modulation controller graduates the opening of the operable shade 312 based on the measured ambient light characteristics (e.g., increasing the closure of the shade to achieve a lower specified brightness).

In another example, the operable shade 312, including the shade itself, actuator, interface with the light modulation controller, biasing elements or the like are installed in one or more corresponding module sockets such as the module sockets 352. Optionally, the module sockets for the operable shade 312 are provided with the fenestration frame 302. In another example, the operable shade 312 is installed in module sockets associated with the panel 306. The operable shade 312 is accordingly installed to the fenestration assembly 300 in a similar manner to one or more other service modules described herein including, but not limited to, light arrays 308, operators 320 or the like.

Figure 4:
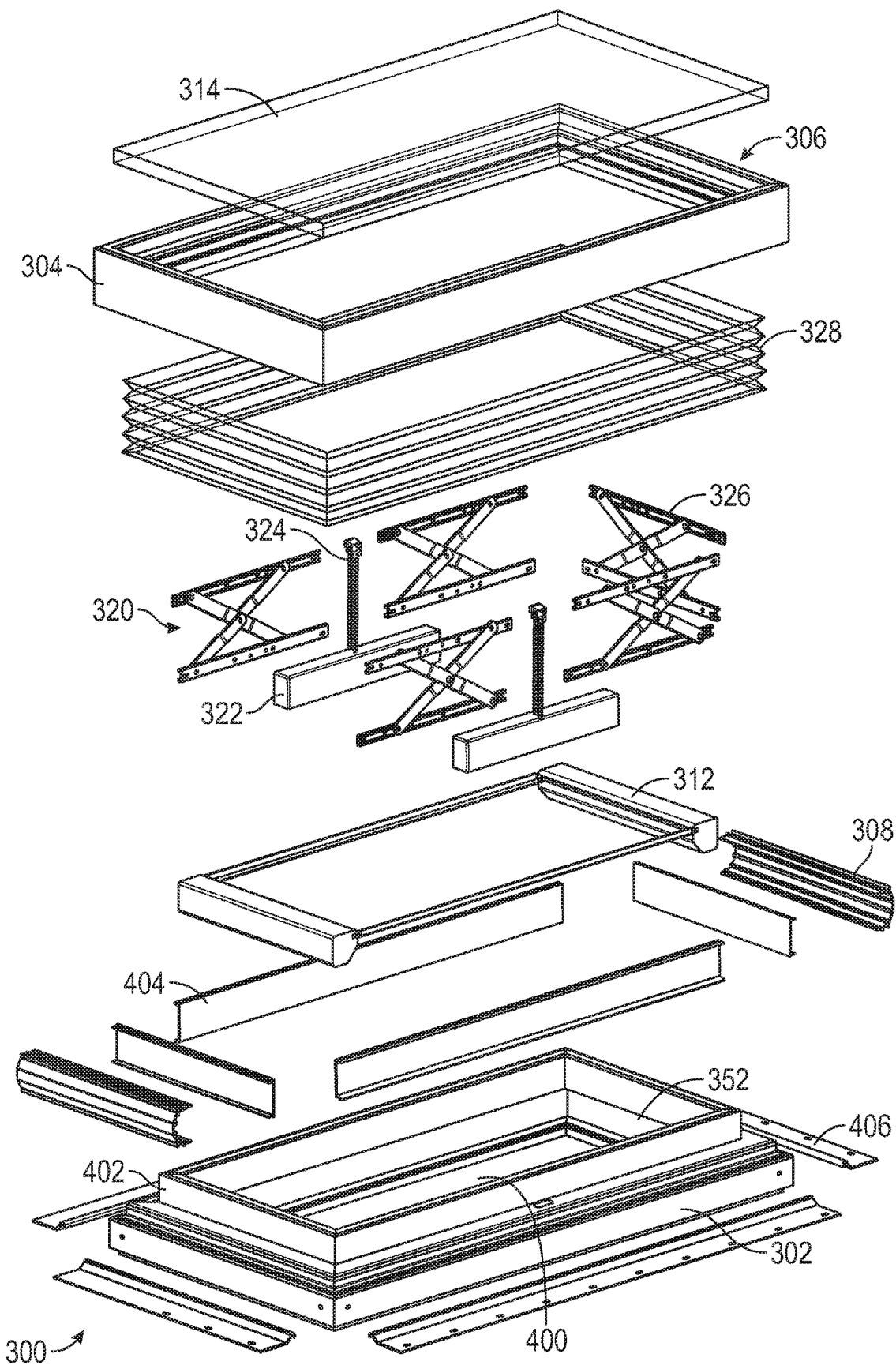
FIG. 4 is an exploded view of the fenestration assembly of FIG. 3A.

FIG. 4 is an exploded view of the fenestration assembly 300 previously described herein. The fenestration assembly 300 includes the fenestration frame 302 and the panel 306. The panel 306 is moveable relative to the fenestration frame 302 with the operator 320. As further shown in FIG. 4, the panel 306, in this example, includes a peripheral frame 304 surrounding a pane 314. The pane 314 includes, but is not limited to, a glazing unit, insulated glazing unit or the like. As further described herein, in one example, the pane 314 includes electrically operable tinting, an example of a light modulating element configured to throttle light from the fenestration assembly 300.

Referring again to FIG. 4, the fenestration frame 302 is shown in the lower portion of the figure. As shown, the fenestration frame 302 includes one or more lineal members, for instance, a sill jamb, header jamb and side jambs. As further shown in FIG. 4, the example fenestration frame 302 includes one or more module sockets 352 extending along an interior portion of one or more of the lineal components of the fenestration frame 302. The module sockets 352 facilitate the installation of one or more service modules including, but not limited to, the operator 320, such as the operator actuator 322; a light array 308 or the like. As shown, for instance, in FIGS. 5A and 5B, the module socket 352 recesses the service modules installed therein from the light shaft 400 and accordingly minimizes (e.g., minimizes or eliminates) obstruction of the light shaft 400 by one or more components of the fenestration assembly 300. One or more socket covers 404 are coupled over the module socket 352 to conceal components installed therein. Optionally, the socket covers 404 include diffusers or filters for the light arrays 308 or other component pieces of service modules installed in the sockets 352.

As further shown in FIG. 4, a panel seat 402 is, in one example, provided with the fenestration frame 302. The panel 306 is seated along the panel seat 402. For instance, the peripheral frame 304 in the closed position extends around and is seated along the panel seat 402 to securely engage the panel 306 with the remainder of the fenestration assembly 300 with the panel 306 in the closed position.

As further shown, the fenestration assembly 300 includes the operator 320 previously described and shown in FIG. 3B. In the example shown in FIG. 4, the operator 320 includes an operator mechanism 324 configured for coupling between the fenestration frame 302 and the panel 306 (e.g., the peripheral frame 304 of the panel). The operator mechanism 324 is coupled with an operator actuator 322 having an electric motor, pneumatic motor, hydraulic motor or the like configured to move the operator mechanism 324 and accordingly position the panel 306 in one or more of an open or closed positions including intermediate positions therebetween. In another example, the operator 320 includes one or more guide linkages 326 coupled between the panel 306 and the fenestration frame 302. The guide linkages 326 and the operator mechanisms 324 provide a minimal discontinuity to the otherwise continuous ventilation perimeter extending between the panel 306 and the fenestration frame 302. Accordingly, ventilation is permitted between the panel 306 and the fenestration frame 302 along each side of the fenestration assembly 300. In contrast, other fenestration assemblies including those having a hinged panel 340 (shown in FIG. 3B in dashed lines) allow ventilation in a limited fashion, for instance, along three sides of the fenestration assembly and potentially capture heated air along an upper portion proximate to the hinge 342. In another example, the guide linkages 326 are installed along one or more components of the fenestration frame 302 including, for instance, one or more of the side jambs and header jamb. In contrast, the sill jamb, the lower portion of the fenestration frame 302 shown to the left in FIG. 4, is without a guide linkage 326 to accordingly maximize visibility and minimize obstruction of daylight delivered through the fenestration assembly 300.

Figure 5A:
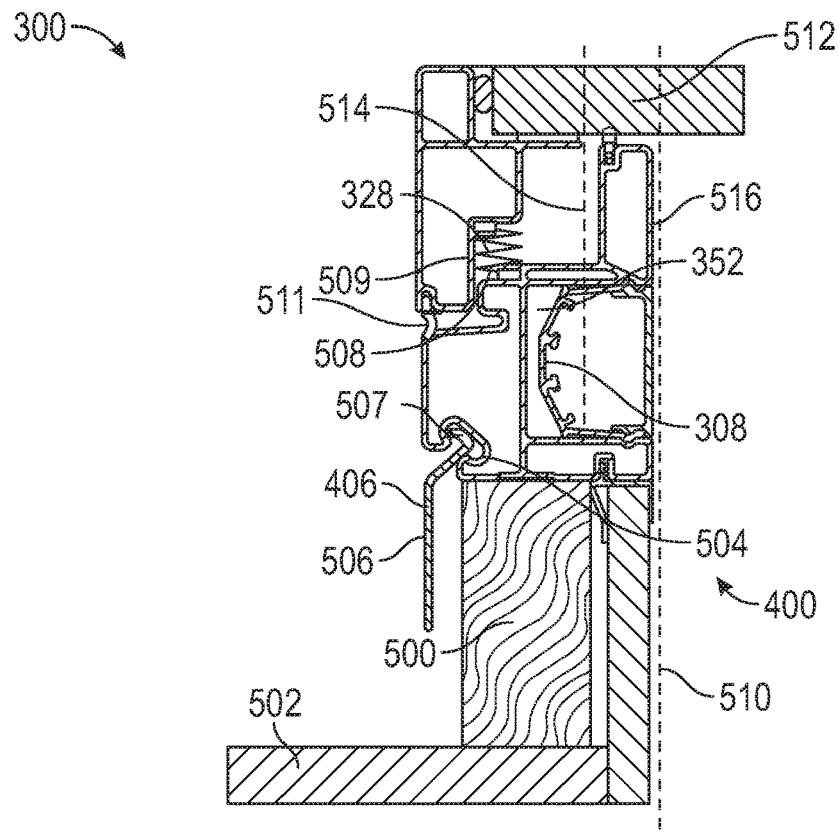
FIG. 5A is a first cross sectional view of the fenestration assembly of FIG. 3A having a curb mounted installation.
Figure 5B:
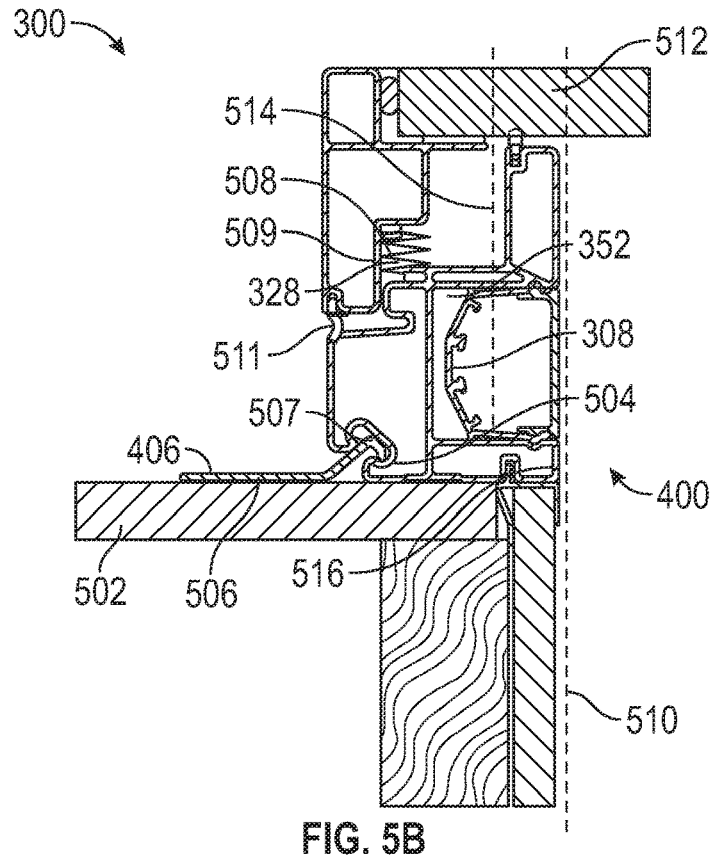
FIG. 5B is a second cross sectional view of the fenestration assembly of FIG. 3A having a deck mounted installation.

As further shown in FIG. 4, the concealed screen assembly 328 in the exploded view is deployed, for instance, with the screen membrane expanded relative to the contracted or stored configurations shown in FIGS. 5A and 5B. As described herein, the concealed screen assembly 328 is coupled between each of the panel 306 and the fenestration frame 302 to prevent the ingress of particulate, debris, insects or the like through the fenestration assembly 300 while at the same time facilitating ventilation along the continuous ventilation perimeter including, for instance, each of the sides of the fenestration assembly 300. In the example shown in FIG. 4, the concealed screen assembly 328 includes a pleated (e.g., corrugated, folded or concertina) screen membrane. In other examples, the concealed screen assembly 328 includes, but is not limited to a telescoping screen membrane configured to slide along one or more components of the fenestration assembly 300, for instance, one or more of the fenestration frame 302 or the peripheral frame 304. In another example, the concealed screen assembly 328 includes a compressible reticulated foam configured to pass air from the interior to the exterior of the fenestration assembly 300 while at the same time minimizing the ingress of particulate, debris or insects.

As further shown in FIG. 4, the fenestration assembly 300, in this example, includes example light modulating elements. One example of a light modulating element includes light arrays 308. In the example shown in FIG. 4, a plurality of light arrays 308 are installed in two or more zones of the fenestration assembly 300. In this example, the zones correspond to the header jamb and sill jamb of the fenestration frame 302. The light arrays 308 have one or more light generating elements including, but not limited to, LEDs, light bulbs, light strips, light bars or the like as well as associated diffusors, filters, actuators to modulate orientation or the like. The light arrays 308 are, in another example, retained in a service module configured for installation within the module socket 352. Optionally, the module socket 352 includes onboard wiring, ports or the like configured to provide power, control or the like between the light array 308 and other components of the building services system 200 described herein including, for instance, the operator interface 208 and the light modulation controller further described herein.

In one example, the light arrays 308 in one or more locations, for example, zones of the fenestration assembly 300, facilitates the generation of light corresponding to one or more specified light prescriptions including, but not limited to, a virtual solar transit, a simulated dawn, simulated dusk or the like. In another example, each of the light arrays 308, as previously described herein, are configured to provide one or more various graduations of light including, but not limited to, variations in brightness (e.g., intensity), temperature (e.g., color) or the like. In various examples, the light arrays 308 include dedicated lights configured to provide the various intensities or temperatures specified. In other examples, the light arrays 308 includes dimmable or adjustable lights such as LEDs each configured to provide a plurality of specified light intensities, light temperatures or the like.

The operable shade 312 is shown also shown in FIG. 4. In this example, the operable shade 312, including the shade spool, tensioning device (e.g., a biased roller) and one or more guides, extends across the light shaft 400. The operable shade 312 is another example of a light modulating element configured to throttle light delivered through the fenestration assembly 300, for instance, to the interior of the building.

Another example of a light modulating element configured to throttle the delivery of light through the fenestration assembly 300 is included with the pane 314. For instance, the pane 314 of the panel 306 includes operable tinting, such as electrically operable tinting configured to provide graduated tinting to the pane 314. In various examples, the fenestration assembly 300 includes one or more of the light modulating elements described herein including, but not limited to, light generating elements and light throttling elements, such as the pane 314 with electrically operable tinting, the operable shade 312 or the light arrays 308.

FIG. 4 additionally shows one or more installation flanges 406 configured for coupling with the fenestration frame 302. As shown and described further in FIGS. 5A, 5B, the installation flanges 406 facilitate a variety of installation styles. In the example of a skylight fenestration assembly 300, the installation flanges include configurations for curb mounted and deck mounted installations. For example, the installation flanges 406 are reversible and orient the flanges 406 to the corresponding installation.

FIGS. 5A and 5B show two installation examples of the fenestration assembly 300. In FIG. 5A, the fenestration assembly 300 is installed in a curb mount, for instance, with an underlying curb frame 500 elevating the fenestration assembly 300 relative to a flat or shallow sloping roof. In contrast, the fenestration assembly 300, shown in FIG. 5B, is installed in a deck mount configuration with the fenestration assembly 300 installed along a roof 502 (or wall) corresponding to one or more of a roof or the like having an increased angle or steeper configuration relative to the roof 502 and fenestration assembly 300 in FIG. 5A.

As further shown in FIGS. 5A and 5B, the fenestration assembly 300 is in a closed configuration with the panel 306 seated along the fenestration frame 302. In the examples shown in FIGS. 5A and 5B, the fenestration frame 302 includes the panel seat 402. The corresponding peripheral frame 304 has a larger inner profile or peripheral frame profile 514 relative to the panel seat 402. Accordingly, the peripheral frame 304 extends around the panel seat 402 is securely seated along the seat 402 over top of the fenestration frame 302.

As further shown in FIGS. 5A and 5B, the concealed screen assembly 328 is shown in a stored configuration, for instance, with the screen membrane 508 pleated (e.g., folded, corrugated, contracted or the like) between the corresponding portions of the panel 306 and the fenestration frame 302. As shown in FIGS. 5A and 5B, the screen membrane 508 extends between each of the peripheral frame 304 of the panel 306 and the fenestration frame 302. In one example, the peripheral frame 304 and the fenestration frame 302 form a screen housing 509 including one or more recesses between the frames 304, 302 configured to store the screen membrane 508 as shown in FIGS. 5A and 5B. As further shown in FIGS. 5A and 5B, a gasket 511 is, in one example, interposed between the panel 306 and the fenestration frame 302 to enclose or seal the fenestration assembly 300 while in the closed position. In one example, the gasket 511 includes butyl rubber, silicone or the like and is coupled with one or more components of the fenestration assembly 300. In the example shown in FIGS. 5A and 5B, the gasket 511 is installed in a a corresponding kerf provided in the peripheral frame 304. Closing of the panel 306 engages the gasket 511 with the corresponding portion of the fenestration frame 302 to seal or enclose the components of the fenestration assembly 300 and thereby isolate the components from the exterior environment. The isolated components include, but are not limited to, the concealed screen assembly 328, the operator 320, one or more of the service modules, onboard sensor assemblies or controllers associated with the assembly 300 or the like.

As further shown in FIGS. 5A and 5B, the fenestration assemblies 300 are alternately shown installed in curb mount and deck mount configurations, respectively. Referring first to FIG. 5A the fenestration assembly 300 is shown coupled along a curb frame 500, for instance, built up from a roof 502 (or wall). The curb frame 500 elevates the fenestration assembly 300 and accordingly minimizes the ingress of moisture from precipitation, water runoff or the like. As further shown in FIG. 5A, the fenestration frame 302 includes an installation flange 406 configured to extend from the fenestration frame 302 and rest or lay along one or more components of the building such as the curb frame 500. In one example, the installation flange 406 provides a flashing component configured to minimize the ingress of moisture. In another example, the installation flange 406 couples the assembly with the building for instance, by way of tacking, nailing, screwing or the like through the flange body 506 to fasten the fenestration assembly 300 to the curb frame 500 and the roof 502.

As further shown in FIG. 5A, the installation flange 406 includes a flange anchor 507 and a flange body 506 extending from the flange anchor 507. In the view shown in FIG. 5A, the flange anchor 507 is installed into a mounting kerf 504 in a manner that suspends the flange body 506 along the curb frame 500. As shown, the mounting kerf 504 is, in one example, reversible. In the deck mount installation shown in FIG. 5B, the flange anchor 507 is reversed and installed in the reversed orientation in the mounting kerf 504 to orient the flange body 506 along the roof 502 (or wall).

As further shown in FIGS. 5A and 5B, the components of the fenestration assembly 300 that otherwise limit a view through the assembly or obstruct daylight passage through the panel 306 are misaligned (e.g., recessed, positioned outside, spaced from) relative to the light shaft 400. As previously shown in FIG. 4, a light shaft 400, in one example, extends through the fenestration frame 302. A light shaft profile 510 in FIGS. 5A, B corresponds, for instance, to the profile of the rough opening through the wall 502. In the example shown in FIG. 5A, the light shaft 400 extends along the curb frame 500 to a flush engagement or flush transition with the fenestration frame 302. Conversely, in FIG. 5B, the light shaft profile 510 transitions flushly to the fenestration frame 502 from the roof 502 and the underlying rough opening frame. As shown in both FIGS. 5A and 5B, the light shaft profile 510 is unobstructed by the fenestration assembly 300. For instance, the fenestration frame 302 including, for instance, a frame profile 516 is misaligned relative to the light shaft profile 510. The frame profile 516 is positioned outside of the light shaft profile 510 and, in one example, is proximate to the light shaft profile 510. Similarly, the light opening profile 512 of the panel 306 is at least flush with the frame profile 516 and the light shaft profile 510. Accordingly, daylight delivered through the panel 306 is readily transmitted through the fenestration assembly 300 without obstruction. Further, and as shown in FIGS. 5A and 5B, a peripheral frame profile 514, for instance, corresponding to the innermost (opaque) components of the peripheral frame 304 is recessed relative to the light opening profile 512, the frame profile 516 and the light shaft profile 510. Accordingly, the peripheral frame 304, in a similar manner to the fenestration frame 302, does not interfere with the transmission of light through the panel 306 to the light shaft 400 and the building associated with the fenestration assembly 300.

As further shown in FIGS. 5A and 5B, example service modules, such as light arrays 308, are installed in the corresponding module socket 352 previously shown in FIG. 4. The light arrays 308 or other service modules are recessed relative to the light shaft profile 510 and accordingly the fenestration assembly 300 retains these components including the light arrays 308, operator 320 or the like in a recessed position relative to the light shaft profile 510 to maintain full delivery of light through the fenestration assembly 300 without obstruction by components of the fenestration assembly 300.

Figure 5C:
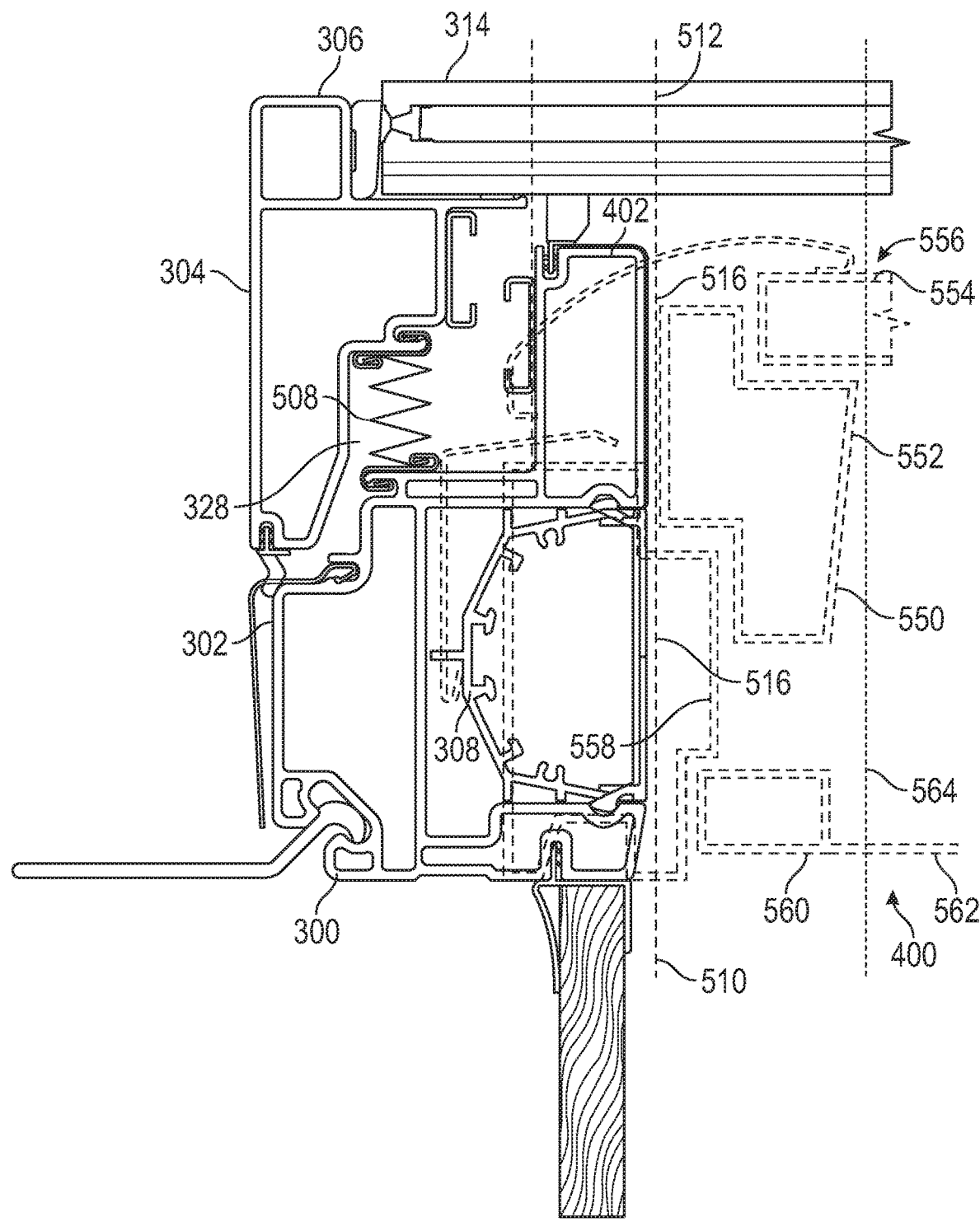
FIG. 5C is a cross sectional view of the fenestration assembly of FIG. 3A in comparison with another example fenestration assembly.

FIG. 5C is a comparison diagram showing the fenestration assembly 300 (previously shown in FIGS. 5B, C) and an inside mount style fenestration assembly 550. The previously described fenestration assembly 300 includes features previously described including a panel 306 movably coupled with a fenestration frame 302. As further shown, each of the light opening profile 512 of the panel 306 and the frame profile 516 of the fenestration frame 302 are outside of the light shaft profile 510 of the light shaft 400 of the rough opening through the wall or roof and the fenestration assembly 300. For example, each of the panel 306, fenestration frame 302 and other associated components of the assembly 300 are misaligned (e.g., recessed, do not overlap or obstruct, are flush or the like) with the light shaft 400 and do not obstruct the passage of light through the assembly and into a building interior or the corresponding view to the building exterior.

Further, features like the concealed screen assembly 328 having the screen membrane 508 are provided between the fenestration frame 302 and the panel 306 and are thereby also misaligned with the light shaft 400. The operator 320 is coupled between the panel 306 and the fenestration frame 302 and, like the concealed screen assembly 328, is outside or misaligned with the light shaft profile 510 to maintain an unobstructed view and enhance the light shaft 400 through the fenestration assembly 300. Additionally, other features such as service modules are installed in corresponding module sockets of the fenestration assembly (e.g., along the fenestration frame 302, the peripheral frame 304 or the like) and also misaligned with the light shaft profile 510. As previously described, service modules include, but are not limited to light arrays 308, operators 320 (e.g., operator actuators 322 and mechanisms 324) as well as an operable shade 312 or one or more of the described fenestration sensors including, but not limited to, the sensor assemblies 204, 206 shown in FIG. 2. Optionally, the exterior sensor assembly 204 is coupled with an exterior portion of the fenestration assembly 300 and accordingly outside of the light shaft profile 510. Accordingly, the light shaft 400 is unobstructed, and is instead fully revealed, opened or the like with an enhanced view and admission of light in comparison to other fenestration assemblies, such as skylights.

Referring again to FIG. 5C, one example of another type of fenestration assembly includes an inside mount fenestration assembly 550 (shown in broken lines). As shown, the inside mount fenestration assembly 550 includes one or more features that obstruct the light shaft 400 and accordingly interfere with a view through the assembly 550 as well as the delivery of daylight therethrough. The inside mount fenestration assembly 550 includes a fenestration frame 558 coupled along a corresponding portion of the wall or roof. As shown in FIG. 5C a portion of the fenestration frame 558 extends into the light shaft 400. Additionally, a shaft spanning screen 560 having a screen membrane 562 of mesh wires or filaments is coupled with the fenestration frame 558 and extends across the light shaft 400. In this example, each of the fenestration frame 558 and the shaft spanning screen 560 extending into or obstruct the light shaft 400.

Additionally, the inside mount fenestration assembly 550 includes a panel 556 (e.g., a translucent panel) having a pane 554 and a panel frame 552. As shown in FIG. 5C, the panel frame 552 is coupled with the fenestration frame 558 along an interior surface of the frame 558. The interior mounted panel frame 552 further extends into the light shaft 400 thereby minimizing the available view and daylight delivered through the inside mount fenestration assembly 550.

As shown in FIG. 5C, the inside mount fenestration assembly 550 includes an inside mount profile 564 corresponding to the interior features of the fenestration assembly 550. As shown the inside mount profile is within the light shaft 400, and the light shaft with the inside mount assembly 550 correspondingly has a shrunk light shaft profile to the light shaft profile 510 shown with the fenestration assembly 300. For instance, the inside mount profile 564 is proximate to and extends along an inner portion of the interior mounted panel frame 552. Additionally, other features extend into the light shaft in another example. These other features include one or more of the shaft spanning screen 560 and the fenestration frame 558. Each of these components extends into the light shaft 400 and accordingly interrupts or obstructs the view and light delivery. In the example of the shaft spanning screen 560, the screen membrane 562 extends fully across the light shaft and the screen mesh thereby intercepts at least some light delivered through the inside mount fenestration assembly 550 and the corresponding view (not otherwise obstructed by the remainder of the assembly 550).

Accordingly, the inside mount fenestration assembly 550 provides a lesser view and lesser light delivery through the assembly in comparison to the fenestration assembly 300 described herein. The fenestration assembly 300, as described above and herein, includes components that are misaligned with the light shaft 400 (e.g., are recessed, do not overlap or obstruct, are flush or the like). For instance, the components of the panel 306 and the fenestration frame 302 that are opaque are offset from the light shaft 400. In one example, the assembly 300 components are installed along the framing of a rough opening corresponding to the light shaft, and not within or intruding across the light shaft 400.

Figure 6:
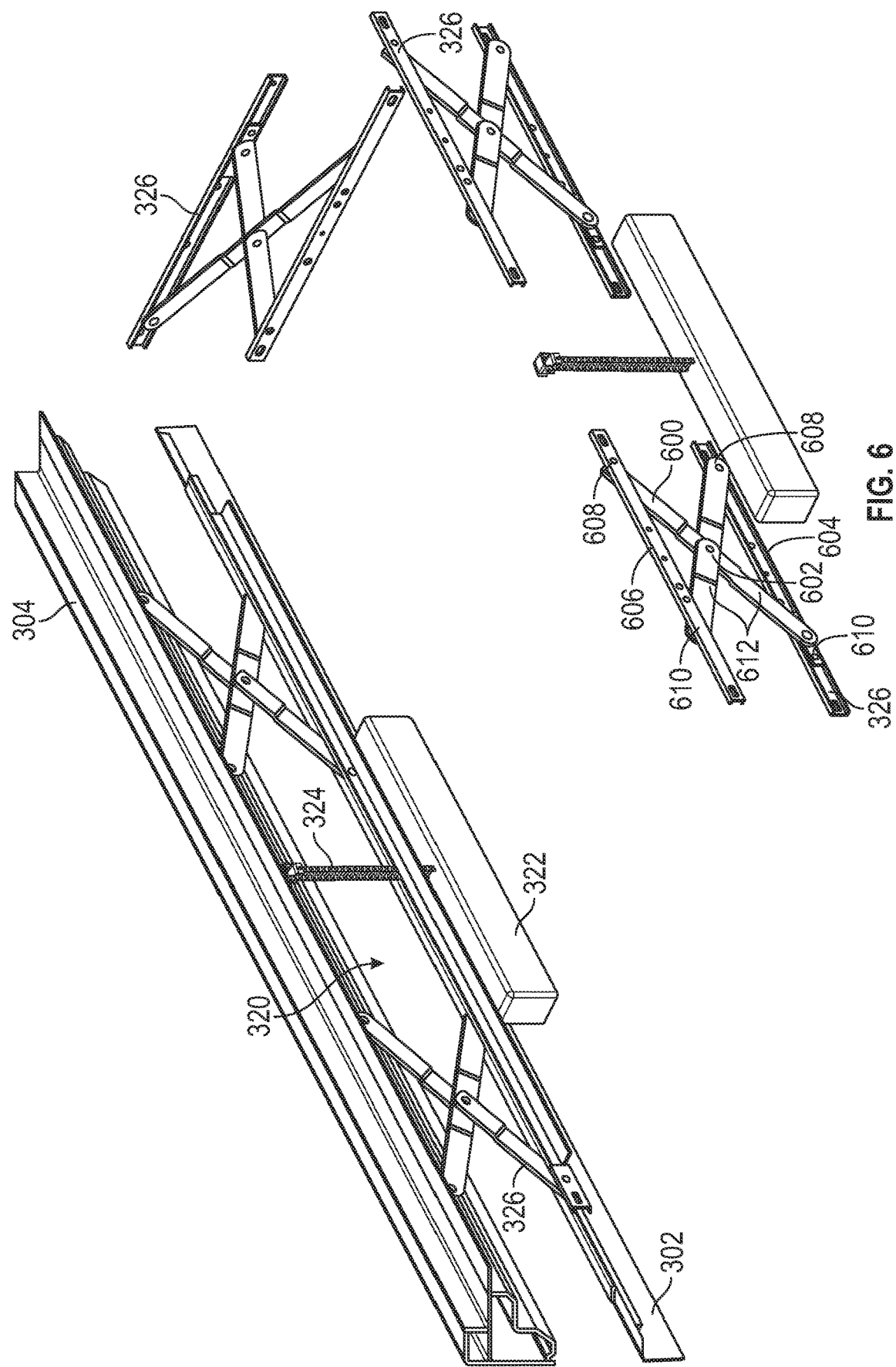
FIG. 6 is a perspective view of one example of an operator configured to open and close the fenestration assembly.

FIG. 6 is a partial view of the fenestration assembly 300 including the operator 320. The operator 320 is coupled between the peripheral frame 304 of the panel 306 and the fenestration frame 302. As previously described, the operator 320 facilitates the transition of the panel 306, including in this example, the peripheral frame 304, between the opened and closed positions including intermediate positions therebetween.

The operator mechanism 324 of the operator 320 includes, but is not limited to, a chain drive, screw drive, three bar linkage, four bar linkage or the like. An operator actuator 322 is coupled with the operator mechanism 324 and drives the operator mechanism 324 move the panel 306 between the opened and closed positions. In the example shown in FIG. 6, the fenestration assembly 300 includes dual operator mechanisms 324 and corresponding operator actuators 322. In one example, the operator mechanisms 324 and operator actuators 322 are installed along one or more side jambs of the fenestration frame 302. In another example, the operator 320 including, for instance, the operator actuator 322 is installed in a module socket 352 provided along the fenestration frame 302 configured to receive one or more service modules such as the operator 320, the light array 308 or the like.

As further shown in FIG. 6, a plurality of guide linkages 326 are positioned around the fenestration frame 302 and the peripheral frame 304. The guide linkages 326 are coupled between the peripheral and fenestration frames 304, 302. In the view shown in FIG. 6, guide linkages 326 are provided along a plurality of sides of the fenestration assembly 300. For instance, the guide linkages 326 are provided along each of the side jambs and header jamb of the fenestration frame 302. Accordingly, the sill jamb of the fenestration assembly 300 and the associated visible space between the peripheral frame 304 and the fenestration frame 302 remains unobstructed, for instance, with opening of the panel 306 to the open configuration. At an inclined skylight installation of the assembly 300 and with the panel 306 in the open position, the view through the ventilation perimeter along the sill jamb is unobstructed because the guide linkages 326 are not positioned within the space therebetween. Instead, guide linkages 326 are optionally installed along one or more other components of the fenestration frame 302 to accordingly provide guidance while at the same time leaving the (visible) sill jamb and the associated space of the continuous ventilation perimeter open and unobstructed (e.g., to facilitate the view through this visible space of the assembly, enhance delivery of light between the panel and the frame, or the like.

Referring again to FIG. 6, the guide linkage 326 is shown in detail. In this example, the guide linkage 326 includes a scissor linkage 600 (also referred to as a parallel stay) having one or more linkage members 612 rotatably coupled at a linkage pivot joint 602. Two of the linkage members 612 include ends having pivot joints 608 rotatably coupled with corresponding panel rails 606 and frame rails 604. Accordingly, the linkage members 612 rotate relative to the panel rails 606 and the frame rails 604 at the pivot joints 608 during movement of the panel 306 between the open and closed positions. Opposed ends of the linkage members 612 are coupled with the panel rails 606 and the frame rails 604 with linkage shuttles 610. The linkage shuttles 610 allow for translating movement of the ends of the linkage members 612 along the corresponding rails 606, 604 while also allowing pivoting or rotation of the linkage members 612 relative to the linkage shuttles 610.

As the operator 320 including the operator mechanism 624 moves the panel 306 between the open and closed positions, the scissor linkage 600 readily raises and lowers with corresponding rotational movement at the linkage pivot joint 602, rotational movement at the pivot joints 608 and rotational and translational movement at the linkage shuttles 610. The articulation of the scissor linkage 600 and the guide linkages 326 generally maintains the panel 306 in a specified orientation relative to the fenestration frame 302. For instance, in one example, the guide linkages 326 maintain the panel 306 in a substantially parallel orientation (e.g., parallel, near to parallel or the like) relative to the fenestration frame 302. In another example, the guide linkages 326 as part of the operator 320 maintain the panel 306 in a spaced position from the fenestration frame 302 to maintain the continuous ventilation perimeter 330 (see FIGS. 3B, C) extending along each of the sides of the fenestration assembly 300 while the panel 306 is open. In one example, the guide linkages 326 cooperate with the remainder of the fenestration assembly 300 to guide positioning of the panel 306 while open and maintain a substantially open configuration around the entirety of the fenestration assembly perimeter as shown with the continuous ventilation perimeter 330.

Figure 7:
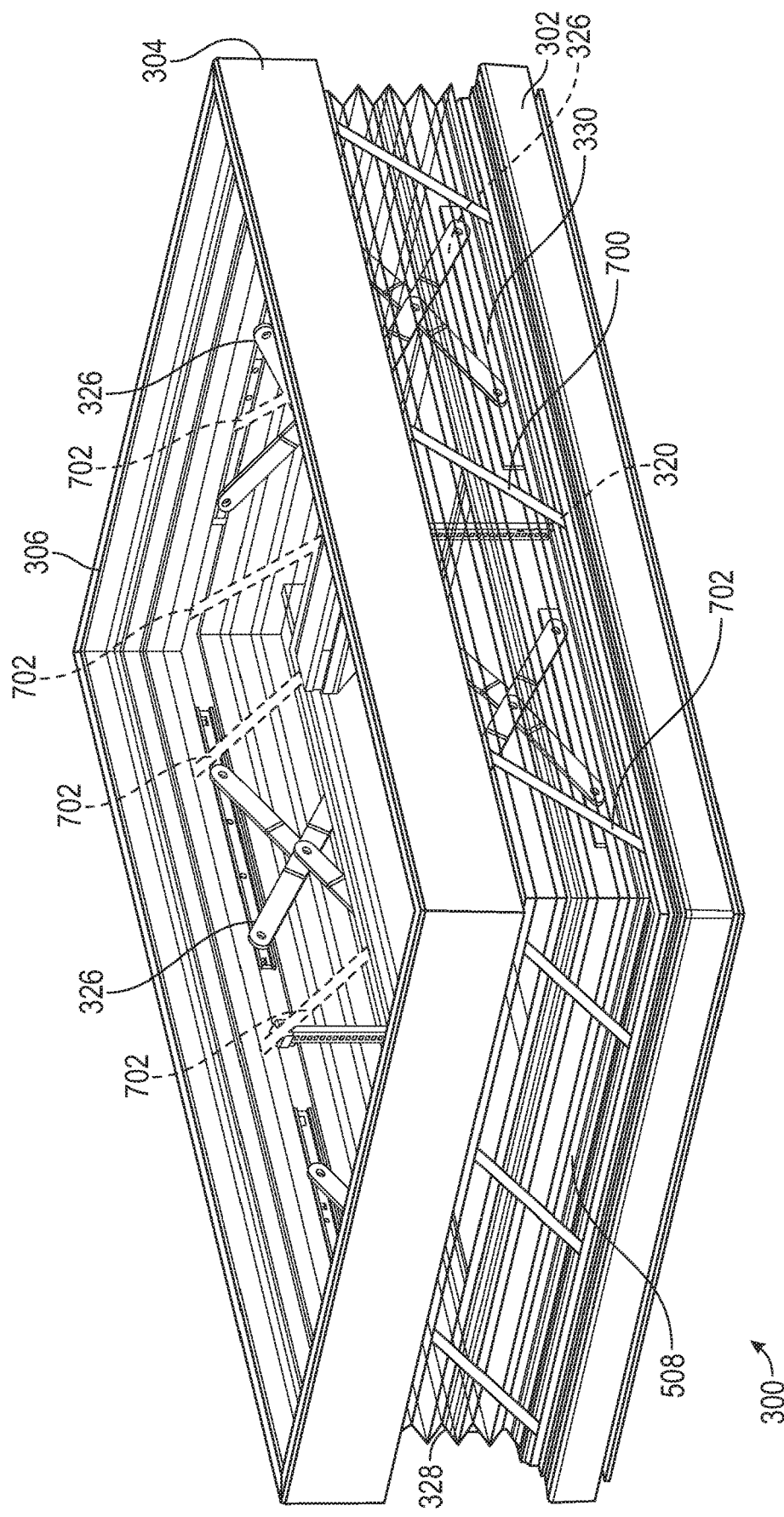
FIG. 7 is a perspective view of one example of a concealed screen assembly with the fenestration assembly in the open configuration.

FIG. 7 shows another view of the fenestration assembly 300 in the open position. In this example, the concealed screen assembly 528, including the screen membrane 508, are in a deployed configuration facilitating ventilation through the continuous ventilation perimeter 330 extending along each of the sides of the fenestration assembly 300. As shown in FIG. 7, the operator 320 including the guide linkages 326 moves the panel 306 to the open position relative to the fenestration frame 302.

In this example, the concealed screen assembly 328 includes a retention cage 700 to constrain movement of the concealed screen assembly 328, specifically the screen membrane 508. For instance, the retention cage 700 retains the screen membrane between (and within the profiles) of each of the fenestration frame 302 and the peripheral frame 304. The retention cage 700 is provided along an outer perimeter of the concealed screen assembly 328 and accordingly braces the screen membrane 508 against lateral deformation including, but not limited to, bowing, buckling or the like.

In one example, the retention cage 700 includes one or more struts 702 positioned around the fenestration assembly 300. The struts 702 include, but are not limited to, one or more of elastomeric tendons, springs or the like stretched between the panel 306 (e.g., the peripheral frame 304) and the fenestration frame 302. Movement of the panel 306, for instance, from the closed position to the open position stretches the struts 702 and maintains the struts 702 in a relatively vertical orientation relative to the adjacent screen membrane 508. Accordingly, throughout translation of the panel 306 between the closed and open positions, the struts 702 are proximate to the screen membrane 508 and constrain outward motion of the screen membrane 508. In another example, the struts 702 guide deployment or contraction of the screen membrane 508. For instance, the struts 702 provide a virtual wall or the like for the screen membrane 508 to unfold or fold along. Accordingly, as the screen membrane 508 expands or contracts, the screen membrane 508 readily moves along the struts 702, and the struts guide the controlled expansion and contraction of the membrane (e.g., folding, unfolding, pleating and opening of pleats or the like).

In another example, the struts 702 include an elastic material, such as, but not limited to, metal alloys such as spring steel, piano wire, shape-memory alloys or the like included along the screen membrane 508. For instance, the struts 702 extend along the exterior perimeter of the screen membrane 508 or are coupled (woven into, bonded, adhered to or the like) with the screen membrane 508. The struts 702, in this example, optionally have a pleated profile (e.g., including folded, concertina, corrugated profiles or the like) to facilitate guidance of pleating of the screen membrane 508 while at the same time constraining or bracing the screen membrane 508 from outward deflection, buckling or the like.

In still another example, the retention cage 700 works in cooperation with one or more of the guide linkages 326 or the operator 320 to constrain movement of the screen membrane 508 both inwardly and outwardly relative to the orientation shown in FIG. 7. For instance, in one example, the guide linkages 326 provided along one or more sides of the fenestration assembly 300 constrain interior movement of the screen membrane 508, for instance, into the light shaft 400, daylight opening or the like. In a similar manner, the retention cage 700, including one or more struts 702, braces the membrane 408 against outward deflection, for instance, in a bowing or buckling fashion relative to the orientation shown in FIG. 7.

Figure 8:
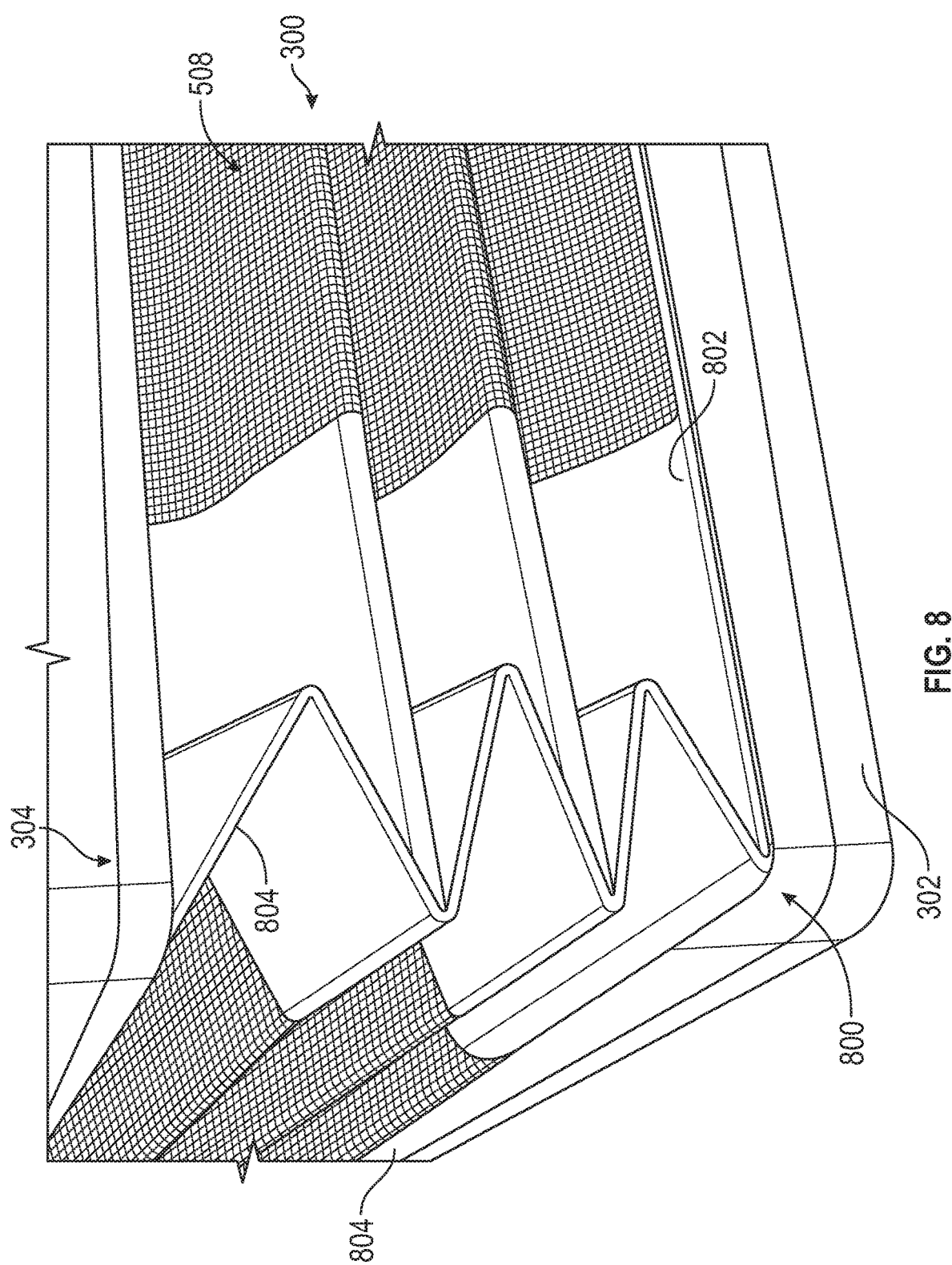
FIG. 8 is a detailed perspective view of a portion of the concealed screen assembly including a pleated strut.

FIG. 8 shows a detailed perspective view of one portion of the screen membrane 508 of the concealed screen assembly 328. In this example, an assembly corner 800 of the fenestration assembly 300 is shown. One or more assembly segments 804, for instance, corresponding to the fenestration frame 302 and the peripheral frame 304 extend from the assembly corner 800. The screen membrane 508, as previously described, is coupled between the peripheral frame 304 and the fenestration frame 302.

As further shown in FIG. 8, the screen membrane 508, in this example, includes a pleat guide 802. The pleat guide 802 is provided at the assembly corner 800 in this example. The pleat guide guides the pleating (e.g., folding, compression, corrugation or the like) of the screen membrane 508, for instance, during opening and closing movements of the panel 306 of the fenestration assembly 300. The pleat guide 802 includes one or more members, sheets or the like provided at specified angles, with specified pleating or the like. Optionally, the pleat guides 802 are mechanically more robust (have a higher tensile strength, greater structural integrity or the like) relative to the remainder of the screen membrane 508 material (e.g., polymer filaments, wire fila-ments or the like). The pleat guide 802 having the greater structural integrity accordingly retains its profile including a pleated profile and imparts that corresponding shape to the screen membrane 508. The pleat guide 802 thereby guides the screen membrane 508 into the pleated configuration shown in FIG. 8 and in other figures herein. Upon closing of the panel 306, for instance, from the open position shown in FIG. 7 to the closed position shown in FIGS. 5A, B, the pleat guides 802, in an example, guide pleating of the screen membrane 508 into a corresponding contract configuration like that shown in the cross sections of FIGS. 5A and 5B.

In another example, the pleat guide 802 includes one or more struts 804, such as the struts 702 previously described and shown in FIG. 7 as part of the retention cage 700. In this example, the struts 804 are included as the pleat guides 802, for instance, at the assembly corner 800. The struts 804 optionally include a shape-memory material such as nitinol, piano wire, spring steel or the like configured to maintain a shape such as the pleated profile shown in FIG. 8 (with dashed lines) to thereby impart a corresponding pleated shape or profile to the screen membrane 508, for instance, during deployment, contraction or the like.

As previously described with regard to FIG. 8, the pleat guides 802 are optionally provided at the assembly corner 800. In other examples, one or more pleat guides 802 (or strut 804) are provided at one or more other locations of the screen membrane 508. For instance, the pleat guides 802 are provided along one or more of the assembly segments 804 corresponding to intermediate portions of the fenestration frame 302, peripheral frame 304 or the like. In one example, the pleat guides 802 are remote relative to the assembly corners 800 and instead positioned along or at one or more locations along the assembly segments 804.

Figure 9:
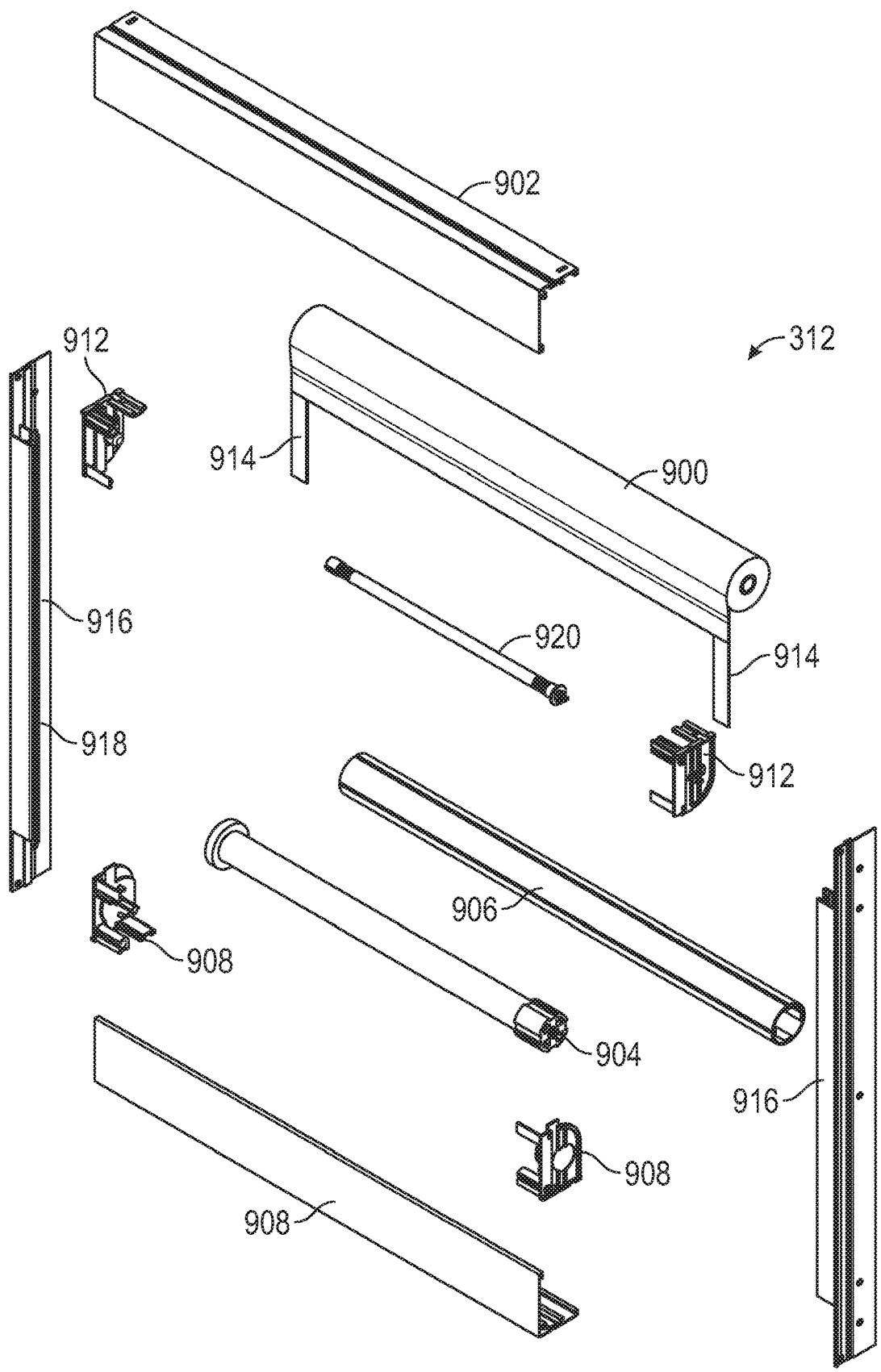
FIG. 9 is an exploded view of one example an operable shade light modulating element.

FIG. 9 is an exploded view of one example of the operable shade 312 previously shown in FIGS. 3A and 3B. The operable shade 312 includes a shade spool 900 including the shade in a rolled configuration. The shade spool 900 is, in one example, provided on a bias reel 920 rotatably held between spool brackets 912. The bias reel 920 rotates the shade spool 900 (clockwise in FIG. 9) to retain the shade in the stored configuration along the shade spool 900. The bias reel 920 includes a biasing element, such as a torsion spring, configured to reel the shade spool 900 into the stored configuration shown.

In this example, the opposed portion of the operable shade 312 includes the shade actuator 904, for instance, mounted between actuator brackets 908. The shade actuator 904 is coupled with an actuator reel 906 extending around a portion of the shade actuator 904. The actuator reel 906 is rotated by the actuator 904 and accordingly draws the operable shade across the light shaft 400 of the fenestration assembly 300. Referring to FIG. 3A, the operable shade 312 is shown in a partially open configuration, for instance, the shade spool is located at the right portion of the fenestration assembly 300 in a corresponding portion of the fenestration frame 302 including, for instance, a header jamb. Conversely, the shade actuator is provided at an opposed portion of the fenestration frame 302 such as the sill jamb. Operation of the shade actuator draws the operable shade 312 from the shade spool 900 shown in FIG. 9 toward the opposed shade actuator shown, for instance, in the opposed portion of the fenestration frame 302 in FIG. 3A.

In one example, each of the shade spool 900 and the shade actuator 904 are provided in one or more corresponding modules, for instance, a spool module 902 and an actuator module 908, respectively. In the spool module 902, the shade spool 900 is provided along the bias reel 920 and the bias reel 920 is in turn coupled with the spool brackets 912 that are coupled with the spool module 902. The spool module 902 including these components is installed within the fenestration assembly. In a similar manner to the spool module 902, the actuator module 908 includes the shade actuator 904 mounted on actuator brackets 908. The actuator brackets 908 are, in one example, coupled with the actuator module 908 for installation at the opposed portion of the fenestration assembly 300.

Optionally, one or more of the spool module 902 or actuator module 908 are installed in module sockets similar to the module sockets 352 shown, for instance, in FIG. 4. In one example, the module socket is provided with the interior of the fenestration frame 302 and a corresponding module 902, 908 is installed to the socket. In another example, the operable shade 312, including the spool and actuator modules 902, 908 are coupled with another component of the fenestration assembly 300 including, for example, the peripheral frame 304 associated with the panel 306. Optionally, the peripheral frame 304 includes module sockets configured to receive the modules 902, 908. In another example, the operable shade modules 902, 908 are installed within the peripheral frame 304.

As further shown in FIG. 9, the operable shade 312, in this example, includes one or more guide rails 916 extending between the spool module 902 and the actuator module 908. In the example shown, the guide rails 916 include guide grooves 918 configured to guide the movement of the operable shade, for instance, from the spool module 902 to the actuator module 908 with operation of the shade actuator 904. Additionally, the guide rails 916 guide retraction of the operable shade, for instance, from the deployed or closed position to the open position with the shade retracted into the shade spool 900. Each of the guide rails 916 includes guide grooves 918. As shown in FIG. 9, the shade spool 900 includes one or more shade belts 914 configured to pass through the guide rails 916, for instance, traveling or passing along guide grooves 918. The guide grooves 918 conceal the shade belts 914 and provide a passage for the shade belts 914 having a corresponding profile (to the shade edges) that maintains the shade in a taut configuration across the light shaft 400. Additionally, the guide rails 906 deliver the shade belts 914 to the shade actuator 904 and guide the leading end of the shade across the light shaft toward the actuator 904.

Figure 10:
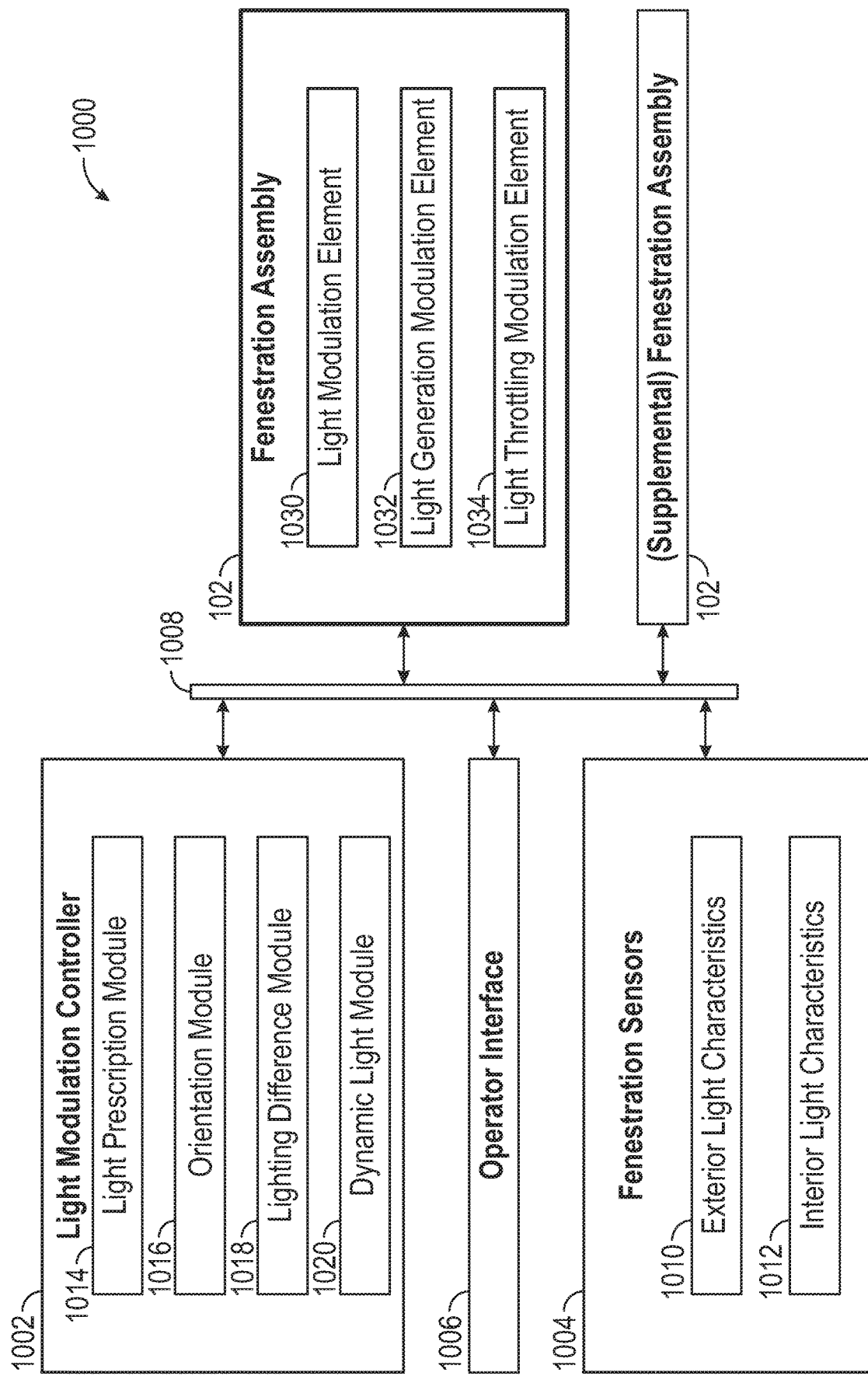
FIG. 10 is a schematic view of a building service control system including one example of a light modulating fenestration system.

FIG. 10 shows one example of a light modulating fenestration system 1000 included as a component of a fenestration assembly, such as the fenestration assemblies 102, 300 described herein or as a component of a building service system such as the building service system 200 shown in FIG. 2. Referring again to FIG. 9, the light modulating fenestration system 1000 is a control system to operate one or more light modulating elements such as a light array, shade assembly, electrically operated tinting or the like.

Referring first to the light modulation controller 1002, shown in FIG. 10, the light modulation controller 1002 includes a light prescription module 1014, an orientation module 1016, a light difference module 1018 and a dynamic light module 1020. Each of the modules are provided, in this example, in the light module controller 1002. Optionally, one or more of the modules are incorporated in separate components of the light modulating fenestration system 100. For instance, the light prescription module 1014 is, in one example, included in an operator interface such as the operator interface 208 shown in FIG. 2 having, but not limited to, a home automation controller, programmed logic controller (PLC), smart thermostat, processor tablet computer, smartphone or the like. In another example, one or more other modules for the controller 1002 are included with a PLC, processor, controller or the like associated with the fenestration assembly 102, for instance, installed in the fenestration assembly 300 described herein. Stated another way, the light modulation controller 1002 optionally includes modules that are distributed between one or more components of the light modulating fenestration system 1000.

As further shown in FIG. 10, the light modulating fenestration system 1000 includes, in one example, an operator interface 1006. The operator interface 1006 corresponds to a physical operator interface 208 like that shown in FIG. 2. In another example, the operator interface 1006 corresponds to an app-based control interface, for instance, provided in an application, tablet, smartphone, laptop computer, home automation controller, including a portable home automation controller or the like. The operator interface 1006 facilitates the entry and storage specified light prescriptions including, but not limited to, impromptu instructions (e.g., to decrease or increase light level), one or more control schemes providing ongoing control of the system 1000 including control of light brightness, light temperature or the like independent of or dependent upon ambient light characteristics.

As further shown in FIG. 10, the light modulating fenestration system 1000, in another example, includes one or more fenestration sensors 1004, for instance, corresponding to one or more of the exterior sensor assembly 204 or interior sensor assembly 206 shown, for instance, in FIG. 2. Optionally, one or more of the fenestration assemblies 102 described herein includes the interior or exterior sensor assemblies or both. The sensors associated with the light modulating fenestration system 1000 include, but are not limited to, light meters, lux meters or the like. The fenestration sensors 1004 are, in various examples, associated with the fenestration assemblies 102. For instance, the fenestration sensors 1004 are coupled along one or more features of the fenestration assemblies 102. In other examples, the fenestration sensors 1004 are remote relative to the fenestration assemblies and, in various examples, coupled with portions of the building 100 (e.g., walls, roof, interior, exterior or the like) In still other examples, the fenestration sensors 1004 are separate from the building and the fenestration assemblies 102 while in communication with the controller 1002. For example, the fenestration sensors 1004 are remote (e.g., a weather service, installed at a different location, housed in a tablet or smart phone, for instance using a phone camera as a light meter or the like) and in communication with an interface 1008 including a wireless interface (Bluetooth, IEEE 802.11 standard wireless network, near field communication network or the like).

In an example including fenestration sensors 1004, such as interior sensor assemblies 206 and exterior sensor assemblies 204, configured to assess ambient light such as daylight, interior (building) light or the like, the fenestration sensors 1004 are configured to measure one or more of brightness (intensity), light temperature (color) or the like. Fenestration sensors 1004 and the detected or measured characteristics provided by the fenestration sensors 1004 are used with the light modulation controller 1002 to determine a prescription difference relative to a specified light prescription and supplement the ambient light (if any) within the building 100 to achieve a specified light prescription. As previously described herein, the light supplement provided by the system 1000, in the case of a dark home or night time conditions, may be the only form of light (e.g., supplemental light includes light generated solely by the system 1000 without ambient light). As further shown in FIG. 10, the light modulating fenestration system 1000 includes one or more fenestration assemblies 102. In the example shown in FIG. 10, the system 1000 includes a first fenestration assembly 102 shown in detail and a second supplemental fenestration assembly 102 shown in an abbreviated fashion relative to the first fenestration assembly 102. The example fenestration assembly 102 provided at the upper location in FIG. 9 includes a light modulation element 1030. Examples of the light modulation element 1030 are described in detail herein and include, but are not limited to, a light generation modulation element 1032 configured to provide supplemental light including generated light, additive light or the like from the fenestration assembly 102. The converse light modulation element includes a light throttling modulation element 1034. In various examples as described herein, the light throttling modulation element 1034 corresponds to, but is not limited to, one or more of an operable shade 312, electrically operable tinting or the like.

As further shown in FIG. 10, the light modulating fenestration system 1000 includes an interface 1008 interconnecting the one or more components of the system 1000 to facilitate the control of the fenestration assembly 102 including the operation of one or more of the light modulation elements 1030 including the light generation modulation element 1032 (e.g., a light array such as the light array 308 shown in FIG. 3C) or a light throttling modulation element (e.g., an operable shade 312 or operable tinting). The interface 1008 includes wired and wireless interconnections. Wired interfaces 1008 include, but are not limited to, hardwiring, one or more buses, a network switch, a network modem or the like. Wireless interfaces 1008 include, but are not limited to, Bluetooth, a IEEE 802.11 standard wireless network, near field communication network or the like.

In operation, the operator interface 1006 includes one or more onboard schemes, receives one or more schemes or receives one or more operator instructions or prompts each corresponding to examples of specified light prescriptions. The light modulation controller 1002 includes a light prescription module 1014 that receives input prescriptions and stores the one or more specified light prescriptions therein.

In an example, the specified light prescription includes a specified light intensity, temperature or the like. The light modulation controller 1002 compares the specified light prescription with the measured light characteristics (e.g., ambient light characteristics) determined or measured by the fenestration sensors 1004. The light difference module 1018 determines a difference (a prescription difference) between the specified light prescription and the determined or measured ambient light characteristics. In various examples, the prescription difference includes, but is not limited to, the difference of lumens between the specified light prescription and the measured or determined ambient light intensity or a difference in light temperature between the specified light prescription and the measured or determined ambient light temperature. The prescription difference determined by the lighting difference module 1018 is provided to the dynamic light module 1020, and the module 1020 operates the fenestration assembly 1002 including the light modulation elements 1030 associated with the fenestration assembly 102 to accordingly achieve or satisfy the specified light prescription.

In one example, the dynamic light module 1020 uses feedback type control to gradually raise or lower (e.g., by a time constant or gain) one or more of the outputs of the fenestration assembly 102 including, for instance, light intensity generated by a light generation modulation element 1032 or a decrease in light intensity provided by the light throttling modulation element 1034. The fenestration sensors 1004 in cooperation with the lighting difference module 1018 continue to measure the ambient light characteristics and update the prescription difference to the current (lower difference). Accordingly, the lighting difference module 1018 cooperates with the dynamic lighting module 1020 and the light modulation elements 1030 to minimize the prescription difference between the specified light prescription and the measured or determined ambient light characteristics from the fenestration sensors 1004 to achieve the specified light prescription.

In various examples, the light prescription module 1014 includes, for instance, one or more of a schedule base scheme or cyclical lighting scheme that modulates the specified light intensity, light temperature or the like within a corresponding zone of the building having the fenestration assembly 102 over a period of hours, days, weeks, months or longer. For instance, in one example, the light prescription module 1014 includes one or more specified light prescriptions configured to provide a virtual or artificial day and night cycle to offset the effects of shortened days during the winter or extended days during the summer or to provide a more active work environment, less active environment to promote rest or the like. In other examples, the light prescription module 1014 provides similar schemes (prescriptions) configured to address lighting levels, for instance, in buildings located at higher latitudes, for instance, having consistently shorter or longer day and night periods depending on the latitude or position relative to the equator.

In another example, the light prescription module 1014 receives or includes one or more operator specified impromptu instructions. In an example including an operator prompt, for instance, to increase a light level in the evening to facilitate work, entertainment or the like, the operator interface 1006 is operated to specify a desired light level and the light prescription module 1014 overrides or pauses a present scheme in place of the instructions from the operator. The lighting difference module 1018 then uses the updated specified light prescription (e.g., the operator prompt) to determine a prescription difference between operator specified light characteristic (e.g., intensity or temperature) and the ambient light characteristic. The dynamic light module 1020 operates the light modulating elements to provide light from the fenestration assembly 102 to achieve the updated specified operator input prescription, for instance with feedback control to minimize the prescription difference (and achieve the updated specified light prescription). In another example, the light modulation controller 1002 is in communication with a plurality of fenestration assemblies, such as the fenestration assembly 102 and the supplemental fenestration assembly 102. In one example, the light modulation controller 1014 provides the same control instructions to each of the fenestration assemblies 102 to accordingly have each of the fenestration assemblies 102 provide a mirrored light output (whether increasing light intensity or temperature or decreasing light intensity or temperature).

In still another example, each of the fenestration assemblies 102 optionally include or are associated with different fenestration sensors 1004. For instance, the first fenestration assembly 102 is associated with fenestration sensors 1004 configured to measure one or more of exterior and interior (ambient) light characteristics 1010, 1012 proximate to that fenestration assembly 102. Similarly, the supplemental fenestration assembly 102 is, in another example, associated with its own fenestration sensors 1004 configured to measure exterior or interior (ambient) light characteristics 1010, 1012 proximate to the supplemental fenestration assembly 102. The light modulation controller 1002 independently controls each of the light modulation elements 1030 associated with each of the fenestration assemblies 102 to independently comply with a specified light prescription of the light modulation controller 1002. Optionally, independent control of each of the light modulation elements 1030 for each assembly 102 based on the unique ambient light characteristics proximate to each assembly allows a room, zone or the like having plural light modulation elements 1030 and variations in ambient light to satisfy the same specified light prescription. For instance the light modulation control 1002 determines prescription differences relative to the prescription for each of the assemblies, and then operates each of the associated light elements 1030 to address (e.g., offset or counter) each of the associated prescription differences. The same overall specified light intensity or temperature at each assembly 102 is thereby achieved even with variations in ambient light characteristics.

Another specified light prescription input at the operator interface 1006 or stored in the light prescription module 1014 includes a control scheme to simulate a solar transit (e.g., from east to west, and according to a specified schedule). In this example, the prescription includes a graduation of light intensity, temperature or the like that modulates throughout a virtual day to simulate the movement of the sun across the sky. This transit includes control of intensity, temperature and location (or orientation of the light) to simulate the transit.

In one example, the fenestration assembly 102 includes one or more light modulation elements 1030, such as light generation modulation elements 1032 (e.g., light arrays 308) or light throttling modulation elements 1034 (e.g., operable shades 312, operable tinting or the like). These elements operate in zones. For instance, as shown in FIGS. 3C and 4 the light arrays 308 are provided at a plurality of locations in the fenestration assembly (e.g., at opposed ends, along one or more jambs or the like). Similarly, the operable shade 312 or tinting is operable to move or tint in a graduated manner across the light shaft 400.

In operation, the light prescription module includes a plurality of intensities, temperatures and locations (orientations, proportional balance of light intensity or the like) indexed to specified parts of the day. For instance, at a specified virtual dawn the fenestration sensors 1004 measure ambient light characteristics (e.g., dark/no ambient light intensity and temperature or some degree of ambient light intensity and temperature), and the lighting difference module determines a prescription difference between the specified light 1018 intensity and temperature for the virtual dawn. The east most light generation modulation elements 1032 of the fenestration assembly 102 (and possibly elements of associated assemblies 102 along the eastern portion of a building) are operated with the dynamic light module 1020 to offset the prescription difference. As the virtual day progresses intensity and temperature for the eastern elements 1030 (or assemblies 102) increase and the western elements 1030 (or assemblies 102) are staggered behind with their respective intensity and temperature. At a virtual midday the intensities and temperatures match. As the day progresses toward dusk the specified light prescription transitions to a converse prescription. For example the specified intensity and temperature for the western elements 1030 (or assemblies 102) is greater than that of the eastern counterparts. The lighting difference module 1018 repeats the determination of prescription differences, and the dynamic light module 1020 operates the light modulation elements 1030 (or western and eastern assemblies 102) to provide a gradual darkening in the east followed by a virtual sunset in the west. Conversely, the light throttling modulation elements 1034 are operated in a similar (though reversed) manner where the virtual day is shorter than an actual day. Optionally, the orientation module 1016 in FIG. 10 provides a dedicated algorithm or weighting configured to convert specified intensities and temperature into the associated proportional intensities and temperatures for eastern and western counterpart light modulating elements 1030.

Figure 11A:
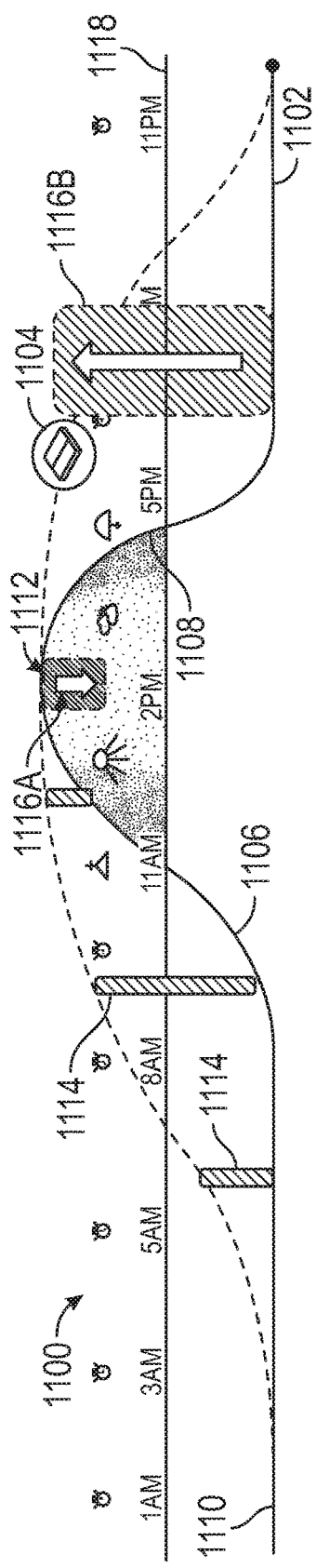
FIG. 11A is a plot of an example day and night cycle including light modulation by way of the light modulating fenestration system of FIG. 10.

FIG. 11A shows one example of a light prescription plot 1100 illustrating one example of a specified light prescription 1104 (dashed lines) configured to provide supplemental light over a period of time extending from 1:00 a.m. to approximately 11:00 p.m. As shown in FIG. 11A, the plot 1100 includes a time index 1118 providing graduations in two hour or three hour increments. The vertical axis of the light prescription plot 1100 corresponds to the intensity of light, whether ambient light such as daylight, interior light (including administered day light and supplemental light) or the like.

As further shown in FIG. 11A, a day/night plot 1102 is shown in a solid line extending from the period of 1:00 a.m. to 11:00 p.m. As shown, the day/night plot 1102 includes an intensity trough 1110 corresponding to the dimmest portion of the day including, for instance, a night period and an intensity peak 1112 corresponding to high sun or a midday period at the assembly location (e.g., latitude, time of year or the like). The example day/night plot 1102 shown in FIG. 11A is one example of a high latitude winter plot. As further shown in FIG. 11A, the specified light prescription 1104 includes a specified series (e.g., a curve or plot) of light intensities over the period of time shown in the light prescription plot 1100. As shown, the specified light prescription 1104 varies relative to the day/night plot 1102. For instance, the specified light prescription 1104 generally specifies a higher intensity relative to the day/night plot 1102 in the early morning hours and evening hours. As further shown in FIG. 11A, an actual dawn 1106 generally shown with the upper trending portion of the day/night plot 1102 is provided and an actual dusk 1108 corresponding to the descending portion of the plot 1102 is also provided. In the example shown in FIG. 11A, dawn and dusk 1106, 1108 have a relatively steep inclination and declination thereby indicating a relatively quick transition from night to day and from day to night.

Referring again to FIG. 11A, a plurality of example prescription differences 1114 are shown between each of the specified light prescription 1104 and the day/night plot 1102. In one example, the prescription differences 1114 correspond to detected differences between ambient light (e.g., actual daylight or the lack thereof, ambient light in a building interior including natural and artificial light or the like) and the corresponding portion of the specified light prescription 1104. In one example, the prescription differences 1114 correspond to lumens and are used, for instance, with the lighting difference module 1018 and the light prescription module 1014 to accordingly ascertain the prescription differences 1114 in an ongoing manner.

With the specified light prescription 1104, shown in FIG. 11A, the dynamic light module 1020 offsets the prescription difference 1114 and accordingly operates the light modulation elements, such as the light modulation elements 1032 shown in FIG. 9, to generate supplemental light to accordingly raise the ambient light level to one or more of the specified intensity or temperature of the specified light prescription 1104. Accordingly, with the light modulating fenestration system 1000, the day/night plot 1102 is virtually supplemented with supplemental light based on the specified light prescription 1104 to provide a graduated and lengthened day period relative to an otherwise long night period. Further, as shown in FIG. 11A, the actual dawn 1106 is virtually enhanced to provide more graduation of the lighting of the interior of the building extending, for instance, from 3:00 a.m. as virtual dawn to approximately 2:00 p.m. corresponding to a high sun or midday period. Conversely, the actual dusk 1108 shown with a steep declination along the day/night plot 1102 is virtually extended to provide a more gradual transition from high sun to an evening and night periods, for instance, extending from the 2:00 p.m. period to approximately 11:00 p.m.

As further shown in FIG. 11A, one or more operator prompts 1116A, 1116B are provided to indicate one more user input changes to the otherwise ongoing specified light prescription 1104. In one example, for instance, at approximately 2:00 p.m., the operator prompt 1116A calls for decreasing of the intensity of light provided by the fenestration assembly 102 (e.g., for midday rest, a nap for a child or the like). For instance, the specified light intensity is approximately half that otherwise provided by ambient light at approximately 2:00 p.m. In such an example, the light modulation element 1030, including the light throttling modulation element 1034, such as an operable shade 312 or electrically operable tinting is operated, for instance by the dynamic light module 1020, to decrease the intensity of light delivered through the fenestration assembly 102 and thereby achieve the updated specified light prescription 1104 input by the operator prompt 1116A.

Conversely, the operator prompt 1116B corresponds to an operator specified increase in light intensity, for instance, for entertainment, evening work or the like, associated with the fenestration assembly 102. As shown in FIG. 11A, the operator prompt 1116B provides an elevated intensity relative to the day/night plot 1102 (and the otherwise ongoing prescription 1104) corresponding to a night period, for instance, with little to no ambient light. In this example, the light modulation element 1030 is operated to generate light that supplements ambient light within the interior of the building to achieve the specified light intensity corresponding to the operator prompt 1116B. At the cessation of the operator specified periods 1116B or 1116A, the specified light prescription 1104 resumes and the corresponding prescription differences 1114 between the specified light prescription 1104 and the day/night plot 1102 are used to accordingly graduate one or more of the light intensity, light temperature or the like provided by the fenestration assembly 102.

Figure 11B:
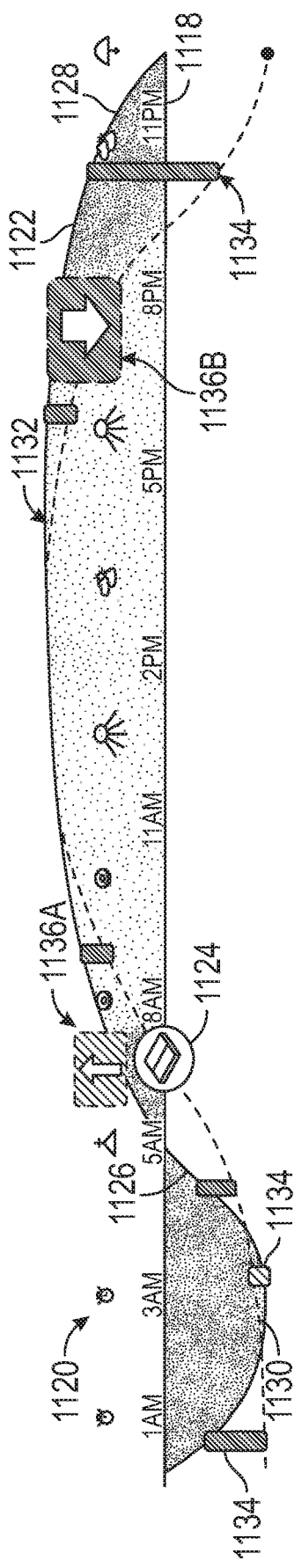
FIG. 11B is a plot of another example day and night cycle including light modulation by way of the light modulating fenestration system of FIG. 10.

FIG. 11B shows another example of a light prescription plot 1120 including a different specified light prescription 1124 (shown in dashed lines). In this example, the light prescription plot 1120 includes a day/night plot 1122 different from that previously shown in FIG. 11A. In this example, the day/night plot 1122 corresponds, in one example, to a high latitude summer period or another long day period relative to a shorter night period. The day/night plot 1122 includes a dawn 1126 and dusk 1128. In a converse manner to the day/night plot 1102 shown in FIG. 11A, the actual dawn 1126 and dusk 1128 have different profiles (e.g., are more shallow) than in FIG. 11A and accordingly have longer time spans.

The light prescription plot 1120, shown with dashed lines indicates a more graduated progression of the specified light desired by the operator relative to the actual dawn and dusk 1126 and 1128. For instance, as shown, the light prescription plot 1120 includes a gradual transition (a virtual dawn), such as brightening, beginning prior to the actual intensity trough 1130 (when ambient day light is darkest) and continuing past the actual intensity trough 1130 to the actual intensity peak at approximately 3:30 p.m. Additionally, a virtual dusk corresponding to the declination of the specified light prescription 1124 begins at an earlier portion of the day, for instance, around 4:00 p.m. and gradually darkens (at some times at a greater rate/slope than the day/night plot 1122) toward a virtual night at approximately 12:00 a.m.

In this example, the light modulating fenestration system 1000 shown in FIG. 10 provides both dimming of ambient light, for instance, daylight, as well as supplemental light in at least one circumstance according to the specified light prescription 1124. The dimming portions of the specified light prescription 1124 are illustrated in the dense crosshatching in the corresponding prescription differences 1134 in FIG. 11B. As shown, the specified light prescription 1124 is less than the corresponding portion of the day/night plot 1122. The prescription difference 1134 corresponds, in one example, to a decrease in relative lumens, temperature or the like of the light within the building based on the specified light prescription 1124. The light modulation controller 1002 determines the prescription difference 1134 based on the specified light prescription 1124 and the ambient light characteristics (including lack thereof). For instance, at 1:00 a.m. the prescription difference 1134 between the specified light prescription 1124 and the day/night plot 1122 is negative and accordingly the light modulation controller provides a negative prescription difference to the dynamic light module 1020. The dynamic light module 1020 accordingly operates the light modulation element 1030, in this example a light throttling modulation element 1034, to decrease the intensity of light delivered through the fenestration assembly 102. For example, the operable shade 312 described herein is moved over at least a portion of the panel 306 and the light shaft 400 to dim or decrease the intensity of light delivered through the assembly. In another example, for instance, with the pane include electrical operable tinting as the light throttling modulation element 1034, the tinting is operated to decrease the intensity of admitted light thereby lowering the intensity of light associated with that particular portion of the building (e.g., the room associated with the fenestration assembly 102). As previously described, the difference is used, for instance in a feedback control loop, as part of the dynamic light module 1020 to graduate the dimness provided by the light throttling modulation element 1034 until the prescription difference trends or reaches a difference of zero indicating the measured light intensity or temperature has achieved the specified light prescription intensity or temperature.

In contrast to the decrease in intensity shown on the left most portion of the light prescription plot 1122, for at least a portion of the day/night plot 1122, the intensity of the day/night plot 1122 is lower than the specified light prescription 1124. For instance, as shown at approximately 3:00 a.m., the day/night plot 1122 extends below the plot of the specified light prescription 1124. The corresponding prescription difference 1134 is shown with a lighter crosshatching relative to the previously described difference 1134 and indicates an increase in intensity of light from the fenestration assembly 102, is specified to offset the prescription difference. In this example, the light prescription module 1014 cooperates with the light difference module 1018 to determine the positive differential and the dynamic light module 1020 implements the positive differential through operation of the light generation modulation elements 1032 corresponding to one or more of the light arrays 308 previously described herein. In this example, the light generation modulation elements 1032 are operated to supplement the light otherwise delivered through the fenestration assembly 102 (natural light) and other forms of ambient light in the building zone associated with the fenestration assembly 102. In an example including a pre-dawn period corresponding with the intensity trough 1130, the supplemented light provided by the light generation modulation element 1032 may, in some examples, be the only generated light provided from or through the fenestration assembly 102.

As further shown in other portions of the light prescription plot 1120, the differences 1134 between the day/night plot 1122 and the specified light prescription 1124 are negative (corresponding to denser crosshatching). The prescription differences 1134 having a darker or dense hatching signal a specified decrease in light intensity, light temperature or the like and accordingly initiate operation of the light throttling modulation element 1034. For instance, at approximately 4:30 a.m., 9:00 a.m., 5:30 p.m. and 10:00 p.m. example (dark) prescription differences are shown. The light throttling modulation element 1034, including one or more of the operable shade 312, electrically operable tinting or the like, is operated to decrease the intensity of light passed through the fenestration assembly 102. Accordingly, the otherwise brighter light at these times along the day/night plot 1122 is diffused, throttled, dimmed, decreased, eliminated or the like (e.g., minimized) prior to delivery to a building including a building zone. Optionally, the specified light prescription 1124 shown in FIG. 11B provides a more graduated equatorial or temperate type cycle of light delivery into the building 100 in comparison to the day/night plot 1122 corresponding to delivery of ambient light in summer or a high latitude summer.

As with the light prescription plot 1100 shown in FIG. 11A, the plot 1120 shown in FIG. 11B includes a plurality of operator prompts 1136A, 1136B. In one example, the operator prompt 1136A corresponds to an earlier morning rise relative to the otherwise specified light prescription 1124. The operator prompt 1136 accordingly initiates an increase in intensity of light delivered from the fenestration assembly 102. For instance, the operator has specified the light intensity should rise to something proximate to the intensity peak 1132 from around 6:00 a.m. to approximately 7:30 a.m. The light difference module 1018 accordingly determines a prescription difference between the specified intensity associated with the operator prompt 1136A and the day/night plot 1122. The light generation modulation element 1032 such as the light arrays 308 are operated with the dynamic light module according to the determined to prescription difference to provide offsetting light to achieve the specified light intensity.

Conversely, another operator prompt 1136B is shown in the right portion of the light prescription plot 1120. In this example, the operator prompt 1136B corresponds to a specified dimming relative to each of the specified light prescription 1124 as well as the day/night plot 1122. In one example, the operator prompt 1136B corresponds to an earlier rest period. The operator specifies that the desired light intensity should deviate from the specified light prescription 1124 to facilitate an earlier rest period. In this example, the operator prompt 1136B corresponds to a dimming at approximately 7:00 p.m. and extending to 8:00 p.m. As shown, the prescription difference is determined between the day/night plot 1122 and the operator prompt 1136B and triggers a dimming through the dynamic light module 1020. In this example, the dynamic light module 1020 operates the light throttling modulation element 1034 (e.g., the operable shade or tinting) to dim the intensity of light delivered through the fenestration assembly 102 and provide the dimmed intensity specified by the operator. As shown at 8:00 p.m., the specified light prescription 1124 naturally progresses to meet the intensity otherwise specified by the operator prompt 1136B. Accordingly, at 8:00 p.m. the operator prompt 1136B (a first prescription) automatically hands off to the ongoing specified light prescription 1124 (a second or ongoing prescription). The light modulating fenestration system 1000 continues to measure the prescription difference 1134 (e.g., automatically) and gradually trends the light intensity, light temperature or like toward the specified light prescription 1124 to offset the ongoing prescription difference 1134.

Figure 12:
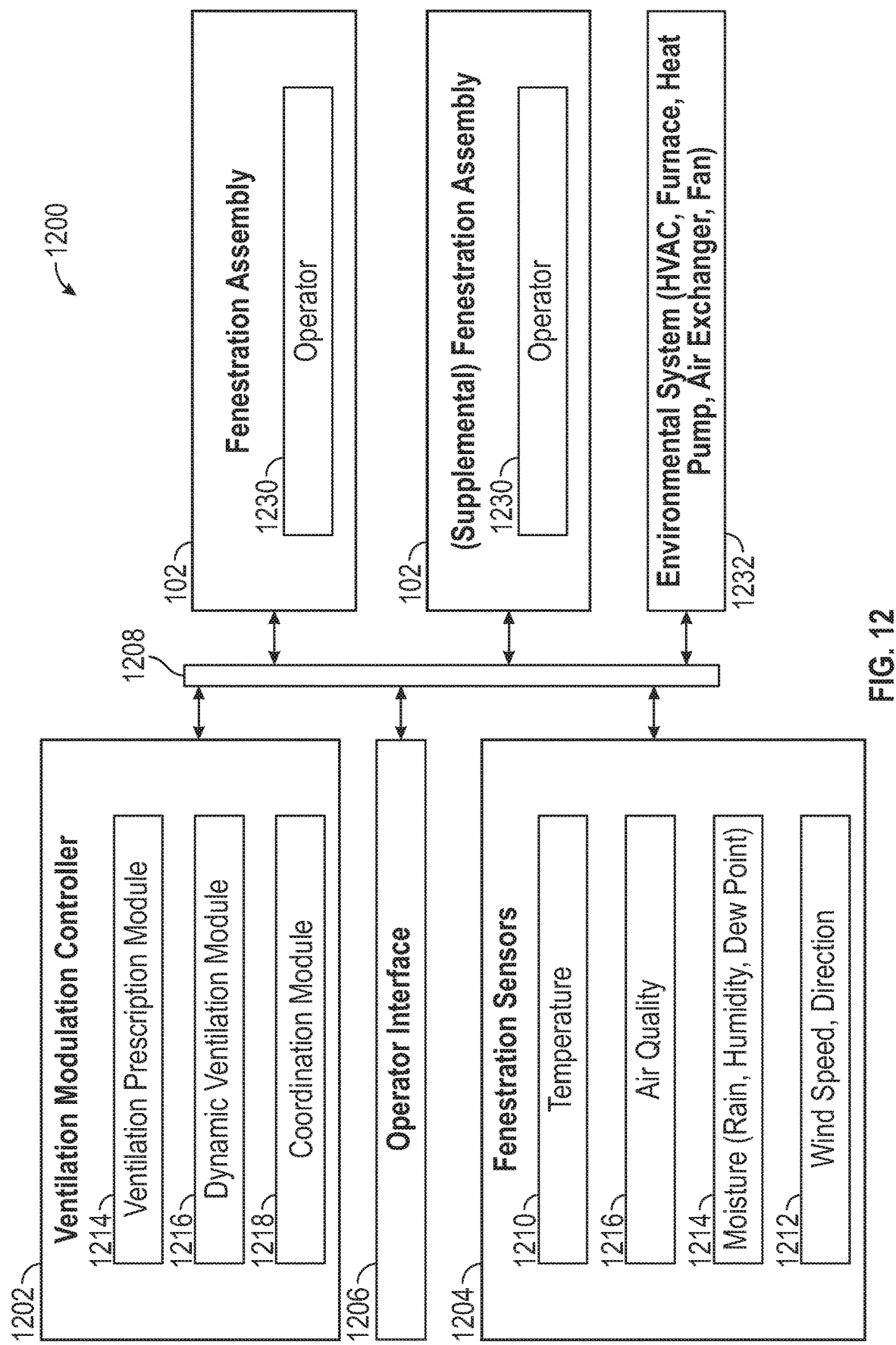
FIG. 12 is a schematic view of a building service control system including one example of a ventilation modulating fenestration system.

FIG. 12 shows one example of a ventilation modulating fenestration system 1200 having one or more components previously described herein. In the example shown in FIG. 12, the system 1200 includes one or more fenestration assemblies 102 (or 300). As shown in this example, the system 1200 includes a first fenestration assembly 102 and a second or supplemental fenestration assembly 102. Each of the fenestration assemblies 102 includes an operator 1230. In one example, the operator 1230 corresponds to one or more of the automated operators described herein. One example of an operator is shown in FIGS. 3B, C including, for instance, the operator mechanism 324 and operator actuator 322 including, but not limited to, a chain drive and associated electric motor, hydraulic motor or the like configured to move the panel 306 between open and closed positions including intermediate positions therebetween.

As further shown in FIG. 12, the ventilation modulating fenestration system 1200 includes a ventilation modulation controller 1202. The controller 1202, in one example, includes one or more submodules configured to modulate ventilation through one or more of the fenestration assemblies 102. An operator interface 1206 is shown in FIG. 12. Optionally, the operator interface 1206 is in communication with the ventilation modulation controller 1202 and is used, in one example, to provide one or more specified ventilation prescriptions including operator prompts, specified ventilation schemes or the like for the system 1200.

Referring again to FIG. 12, the ventilation modulation controller 1202 includes a ventilation prescription module 1214 having one or more stored ventilation schemes, input ventilation schemes or the like. In another example, the ventilation prescription module 1214 facilitates the modification, updating or addition of additional ventilation schemes. In still another example, the operator interface 1206 (e.g., an operator interface 208 shown in FIG. 2) is used as an input element or input feature configured to provide one or more ongoing prescriptions, operator prompts or the like to the ventilation prescription module 1214 to modify schemes, add additional ventilation schemes or provide temporary or ongoing operator prompts to adjust operation of one or more of the fenestration assemblies 102 and accordingly adjust the ventilation for an associated zone such as a building interior, building room or the like.

As further shown in FIG. 12, the ventilation modulation controller 1202 includes, in another example, a dynamic ventilation module 1216. The dynamic ventilation module 1216 coordinates with one or more of the operators 1230 associated with the fenestration assemblies 102 to open and close the panels to initiate and control ventilation according to the ventilation prescriptions stored or input to the ventilation prescription module 1214.

In another example, the ventilation modulation controller 1202 includes a coordination module 1218. As described herein, the coordination module 1218 receives one or more characteristics of the fenestration assemblies 102, for instance, detected open and closed conditions, position of the panels (e.g., closed, open or intermediate positions therebetween). The coordination module 1218, in one example, cooperates with the ventilation prescription module and dynamic ventilation module 1214, 1216 to coordinate the opening of one or more of the fenestration assemblies 102 while another fenestration assembly 102 associated with the system is open. For instance, as shown in FIG. 2, one or more sensor assemblies, such as interior sensor assemblies 206 are associated with each of the fenestration assemblies 102 including, but not limited to, a door or window. In one example, the ventilation modulating fenestration system 1200 (e.g., as a component of a building service system 200 shown in FIG. 2) is configured to operate one or more additional fenestration assemblies, for instance, the fenestration assembly 102 associated with the upper portion of the building, such as a skylight, in coordination with opening of one of the window or door of the building 100 (e.g., another fenestration assembly 102). For instance, if a sash of the window fenestration assembly 102 is opened the coordination module 1218 receives the status indicator from the corresponding interior sensor assembly 206 associated with that fenestration assembly 102 and operates one of the other fenestration assemblies 102 provided with the system 1200. For instance, the panel of the fenestration assembly 102, such as the skylight in FIG. 2, is opened to facilitate ventilation through the building 100, for instance a draft between each of the open fenestration assemblies 102. The coordination module 1218 enhances the ventilation provided by one or more of the fenestration assemblies 102 by coordinating opening and closing with additional fenestration assemblies associated with the ventilation modulating fenestration system 1200.

In another example, the ventilation modulating fenestration system 1200 includes one or more environmental systems 1232. Referring again to FIG. 2, the environmental systems 1232 include, but are not limited to, one or more environmental conditioning units such as a fan 202, furnace 210, air conditioning unit 212 or one or more other devices such as a heat pump, geothermal heating or cooling unit or the like. Optionally, the ventilation modulation controller 1202 coordinates the operation of one or more of the environmental systems 1232 with one or more of the fenestration assemblies 102 in a manner similar to coordination between operation or opening of the fenestration assemblies 102 as previously described hereinabove. For instance, on a warm day operation of the environmental conditioning unit 212 (e.g., a first operational status of an air conditioning unit, such as running or operating) is provided to the coordination module 1218. The coordination module 1218 accordingly operates a fenestration assembly 102, such as the assembly 102 associated with the upper portion 104 of the home (e.g., a skylight). Operation of the fenestration assembly, for instance, through the operator 1230 is automatically controlled by the coordination module 1218 to coincide with the operation of the air conditioner 212. Accordingly, as cool air is delivered to the house the fenestration assembly 102 is opened with the operator 1230 to exhaust heated air otherwise trapped in the building 100. Conversely, with cessation of operation (e.g., a second operational status, for instance including a blower shut off or the like) the coordination module 1218 optionally initiates closing of the fenestration assembly 102 with the operator 1230, for instance to prevent the escape of cooler air. In another example, the assembly 102 is left open to facilitate additional exhaust of warm air as the warm air rises to the assembly.

As further shown in FIG. 12, the ventilation modulating fenestration system 1200 includes one or more fenestration sensors 1204 associated with the system 1200. The fenestration sensors 1204 include, but are not limited to, one or more sensors configured to measure, determine or sense temperature, air quality, moisture (e.g., precipitation), humidity, dew point, one or more wind characteristics such as wind speed, wind direction or the like. As shown in FIG. 12, the fenestration sensors 1204 include one or more of a temperature sensor 1210 or a wind characteristic sensor 1212 configured to measure one or more of wind speed, wind direction or the like. In another example, the sensors 1204 include an air quality sensor 1216, for instance, configured to measure one or more particulate types (e.g., parts per million), contaminants or the like in the air such as the air surrounding the building 100. In still another example, the one or more fenestration sensors 1204 include moisture sensors configured to measure one or more of exterior humidity, dew point, precipitation or the like. Optionally, the moisture sensor 1214 is, in one example, associated with an interior portion of the building and accordingly determines the humidity of the interior spaces associated with the fenestration system 1200. Optionally, the system 1200 determines a humidity difference between the exterior environment and the interior environment of the building and initiates ventilation (opening of the fenestration assemblies 102) based on the humidity difference, for instance opening the assemblies 102 if the exterior humidity is lower than the interior humidity.

As further shown in FIG. 12, an interface 1208 interconnects each of the various components of the fenestration system 1200. In one example, the interface 1208 includes a hardwired connection between the one or more components including, for instance, a series of Ethernet connections between each of the one or more components. In such an example, Ethernet cables are run to each of the fenestration assemblies 102, the controller 1202 as well as one or more of the operator interface 1206 and fenestration sensors 1204. Optionally, the fenestration sensors 1204 are associated with one or more of the fenestration assemblies 102 or one or more other components of the system 1200. In some examples, the fenestration sensors 1204 are remote relative to the remainder of the system 1200 including a weather service, remote sensors or the like, and interconnect with wired or wireless connections.

In another example, each of the components, such as the controller 1202, operator interface 1206, sensors 1204, fenestration assemblies 102 and environmental systems 1232, are interconnected with one or more wireless connections including, for instance, wireless connections (Bluetooth, IEEE 802.11 standard, near field, infrared, radio frequency or the like) provided by a wireless modem, such as the interface 210 shown in FIG. 2. The interface 210 wirelessly interconnects each of the components to facilitate their communication and control of one or more of the components including, but not limited to, the fenestration assemblies 102, environmental systems 1232 or the like. In another example, the interface 1208 includes a mixed series of interconnections. For instance, the operator interface 1206 is, in one example, interconnected with the ventilation modulation controller with a hardwired connection such as an Ethernet connection, bus or the like. In contrast, the fenestration assemblies 102 are, in various examples, wirelessly connected with one or more of the ventilation modulation controller 1202 or operator interface 1206.

Figure 13A:
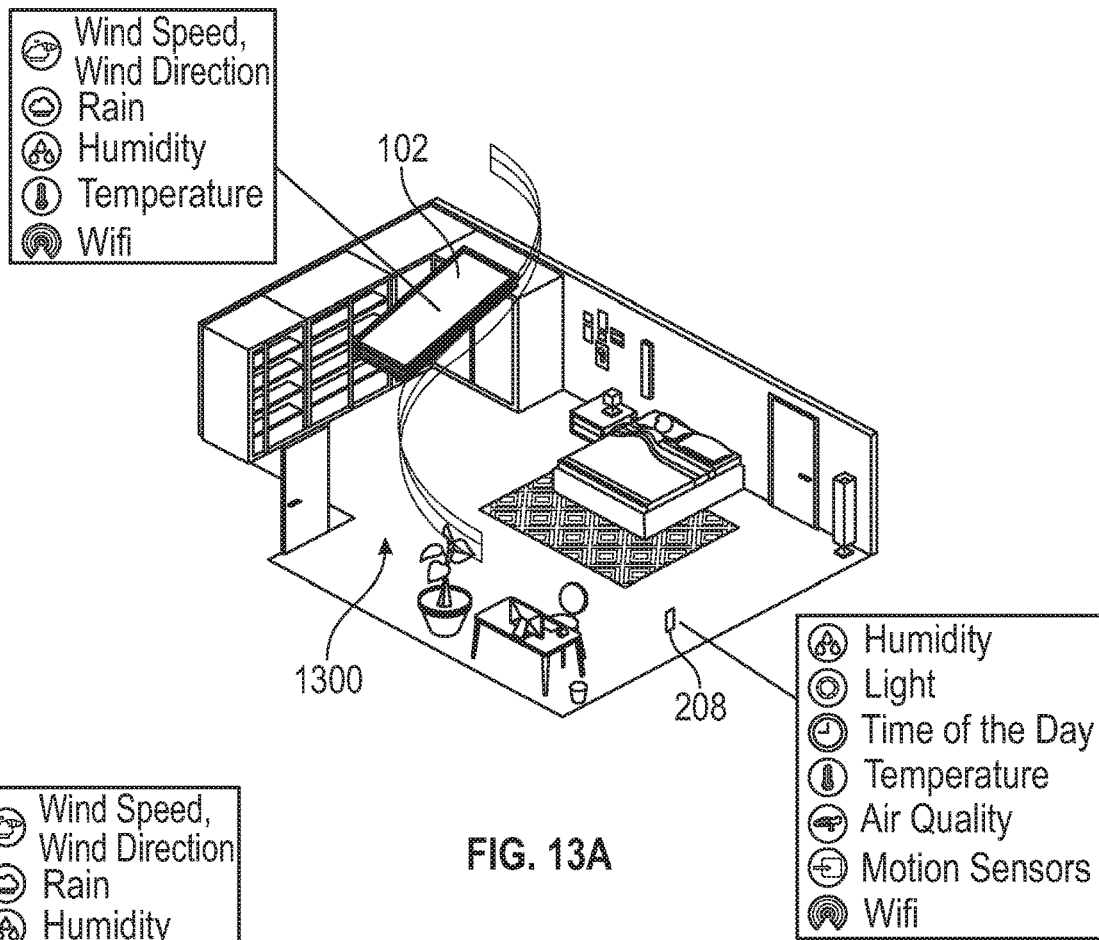
FIG. 13A is an example ventilation schematic implemented with the ventilation modulating fenestration system of FIG. 12.
Figure 13B:
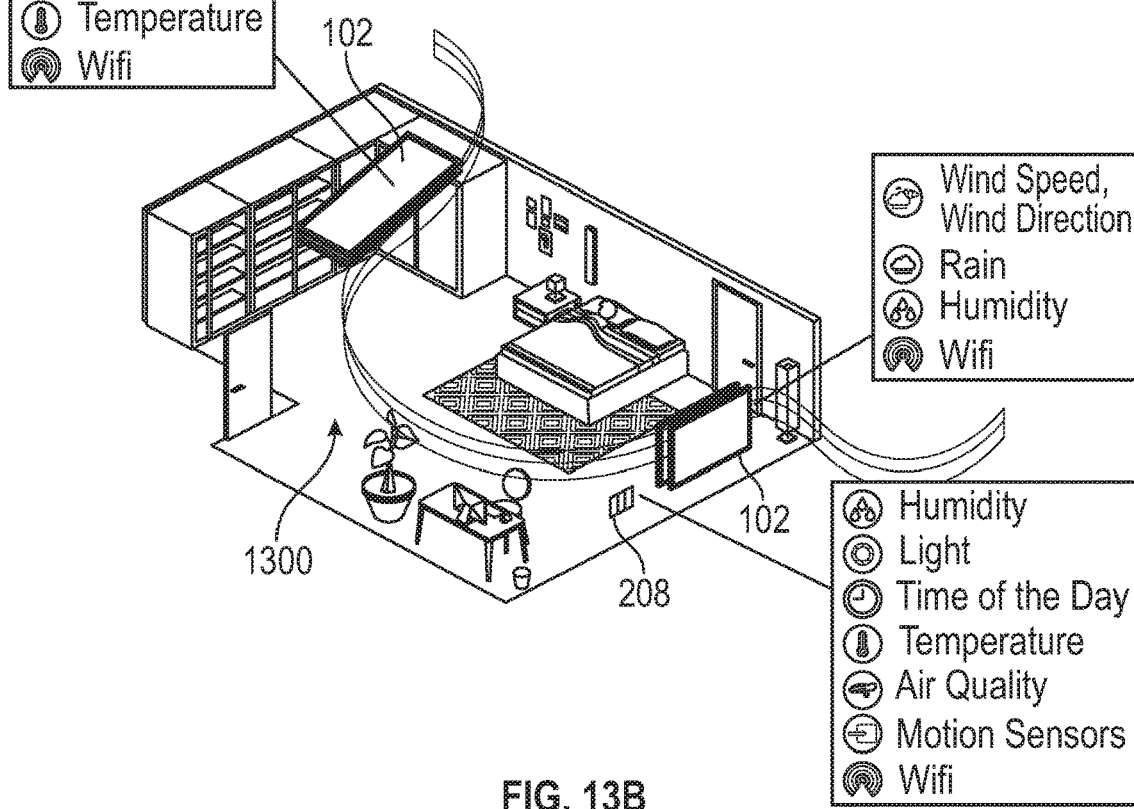
FIG. 13B is another example ventilation schematic implemented with the ventilation modulating fenestration system of FIG. 12.

FIGS. 13A, 13B show two example diagrams of a building zone 1300. The building zone 1300, in this example, corresponds to a room, volume or the like, for instance a component room or space in an overall building, such as the building 100 shown in FIGS. 1 and 2. In the example shown in FIG. 13A, the building zone 1300 includes at least one fenestration assembly 102. The fenestration assembly 102 example includes a skylight including an operable panel, such as the panel 306 previously described and shown in FIGS. 3A-C. As further shown in FIG. 13A, the fenestration assembly 102 is in communication with an operator interface such as the operator interface 1206 shown in FIG. 12 and optionally corresponding to an operator interface 208 like that shown in FIG. 2. For instance, the operator interface 208 includes, but is not limited to, a thermostat, home automation controller, wireless control device for the fenestration assembly 102, tablet computer, smart phone or the like. Additionally, one or more of the features of the ventilation modulating fenestration system 1200 are included in one or more of the fenestration assembly 102 or the operator interface 208. In one example, the ventilation modulation controller 1202, the operator interface 1206 and one or more of the interface 1208 and fenestration sensors 1204 are included with the operator interface 208. In another example, fenestration sensors 1204 and the ventilation modulation controller 1202 are included with the fenestration assembly 102 while the operator interface 1206, in one example, is provided at the operator interface 208 shown in FIG. 13A. In another example, the operator interface 1206, shown in FIG. 12, is instead included in an application-based device such as a tablet, smartphone or the like.

The fenestration assembly 102 (e.g., a component of the ventilation modulation fenestration system 1200), is operated according to one or more ventilation prescriptions. In one example, the ventilation modulation controller 1202 includes a warm weather ventilation prescription. For instance, with an elevated exterior temperature relative to an interior temperature of the building zone 1300 an air conditioner 212 (an example environmental conditioning system) cools the building zone 1300 to a specified set point such as room temperature. In this example, warm air is accumulated in the upper portions of the building zone 1300, for instance, proximate to the fenestration assembly 102. The ventilation modulating fenestration system 1200, including one or more of the modules 1214-1218, exhausts the accumulated heated air through opening of the fenestration assembly 102.

Optionally, a thermometer (e.g., temperature sensor 1210 of the fenestration sensors 1204) is associated, in one example, with the fenestration assembly 102. For example, the thermometer is installed along the fenestration frame 302 or proximate to the assembly 102 (e.g., along a ceiling, wall or the like). As the temperature rises proximate to the temperature sensor 1210 (e.g., above a set point such as room temperature) the ventilation modulation controller 1214 having the warm weather ventilation prescription opens the assembly by way of the dynamic ventilation module 1216 and the operator 1230. Opening of the fenestration assembly 102 exhausts or vents accumulated higher temperature air in the building zone 1300 and accordingly enhances the cooling of the building zone 1300. In one example, operation of the air conditioner (e.g., unit 212 in FIG. 2) is minimized because heated air is exhausted and thereby not cooled with the conditioned air. In other examples, exhausting of the accumulated hot air facilitates the cooling of the building zone 1300 without operation of the environmental conditioning unit 212. For instance, as heated air is exhausted through the fenestration assembly 102, a lower temperature is more readily maintained within the building zone 1300 without operation or with minimal operation of the environmental conditioning unit 212. Another example ventilation prescription is optionally stored or input to the ventilation prescription module 1214. In this example prescription cooler weather, wind, breeze or the like (e.g., exterior temperature or exterior wind characteristic) is a control input for opening (and closing) of the fenestration assembly 102 with the operator 1230. For instance, with a breeze or wind greater than a specified threshold (e.g., wind speed, temperature, combination of both or the like) including in the prescription module 1214 the dynamic ventilation module 1216 opens the fenestration assembly 102 with the operator 1230 to institute a draft through the building zone 1300 and cool the building therein. Opening of the fenestration assembly 102 according to this prescription exhausts stagnant air from the building zone 1300. In another example, opening the fenestration assembly 102 exhausts heated air captured near the upper portion of the building zone 1300 (e.g., in bedrooms). For instance, during the summer or winter heated air accumulates in the upper portions of a building through operation of a furnace or falling of cooled conditioned air and rising of stagnant heated air). The exhaust prescription described herein facilitates the rapid exhaustion of the heated air to provide a pleasant environment for sleeping, occupancy or the like.

In still another example, the ventilation prescription module 1214 includes a prescription that bases operation of the fenestration assembly 102 (e.g., opening, closing, and intermediate positions of the panel) on measured humidity including dew point. In this example, if the humidity of the exterior environment measured with the moisture sensor 1214 (e.g., exterior sensor assembly 204) is below a specified threshold of humidity (e.g., a dew point of 55 degrees or less) the fenestration assembly 102 is opened according and facilitates the exchange of dryer exterior air (e.g., fresh air) with the previous interior air.

In another example, enhanced humidity is specified for the building zone 1300, for instance, after continuous or near continuous operation of an air conditioner or furnace. Interior humidity may fall to uncomfortable levels (e.g., dew points of 45 degrees or less). In this example, the ventilation prescription initiates opening of the fenestration assembly based on an assessment of the exterior humidity relative to the interior humidity. For instance, the prescription module 1214 includes an if/then rule, such as if the interior dew point is less than 45 degrees and the exterior dew point is greater than 45 degrees then the dynamic ventilation module 1216 initiates opening of the fenestration assembly 102 with the operator 1230 to humidify the interior air. One or more conditions are added to the prescription in another example, including a temperature condition (e.g., if the temperature is greater than 80 degrees Fahrenheit or less than 20 degrees Fahrenheit) that overrides the opening of the fenestration assembly 102 to maintain a specified temperature in the building.

FIG. 13B shows another example of the building zone 1300 and the ventilation modulating fenestration system 1200 including a plurality of fenestration assemblies 102. In the example shown, the system 1200 includes a first fenestration assembly 102 corresponding to a skylight and a second fenestration assembly 102 corresponding to a window. In other examples, the fenestration assemblies 102 include one or more doors, windows, skylights or the like.

As shown in FIG. 13B, the fenestration assemblies 102 are, in this example, coordinated to open (and optionally close) in tandem to facilitate a draft or breeze through the building zone 1300. In such an example, one or more of the fenestration assemblies 102 includes a status sensor, for instance, as one or more of the fenestration sensors 1204 shown in FIG. 12. One example of the fenestration sensors 1204 is shown with the interior sensor assemblies 206 associated with one or more of the fenestration assemblies 102 in FIG. 2. In a coordinating example, one or more of the fenestration assemblies 102, shown in FIG. 13B, is open. The fenestration sensors 1204 (e.g., interior sensor assembly 206) detects the open status of the fenestration assembly 102. The ventilation modulation controller 1202, for instance having the coordination module 1218, coordinates the opening or operation of the other fenestration assembly 102 of the system 1200. In this example, the fenestration assembly 102 (e.g., the skylight shown in FIG. 13B) is opened in tandem with the fenestration assembly 102 sensed as open. Accordingly, a draft, breeze or the like is automatically initiated through the building zone 1300. In other examples, the ventilation modulating fenestration system 1200 includes a plurality of fenestration assemblies 102 including one or more skylights, windows, doors or the like. In various examples, these fenestration assemblies are provided around a building, for instance, facing in various directions, orientations or the like. The ventilation modulating fenestration system 1200 optionally coordinates the opening of the one or more fenestration assemblies 102 to enhance the draft or breeze through one or more building zones 1300. For instance, in a scenario including a wind direction from west to east corresponding fenestration assemblies 102 are opened to enhance a draft and ventilation through the building. The ventilation modulating fenestration system 1200 includes a wind characteristic sensor 1212 that detects the west to east wind direction. The ventilation modulation controller 1202 accordingly coordinates by way of the coordination module 1218, the opening of corresponding fenestration assemblies 102 provided on the west and the east portions of the building. The pressure differential on the windward (west) and leeward (east) sides initiates a corresponding draft or breeze through the building. In this example with coordination of fenestration assembly 102 operation a breeze, draft or the like is enhanced that correspondingly facilitates conditioning of the interior environment.

Optionally, the ventilation prescription module 1214 is configured to accept operator prompts, for instance, from the operator interface 1206 or 208, shown in FIG. 13B (and FIG. 2). In one example, operator prompts include, but are not limited to, operator inputs that trigger the opening of one or more of the fenestration assemblies 102 by way of the operators 1230 at user specified times during the day. For instance, in the evening after operation of a furnace during cooler periods the upper levels of a building accumulate warm air. Residents may seek to rest in the upper floors usually having bedrooms, however the accumulated warm air may frustrate rest. In this example, the ventilation modulation controller 1202 automatically or according to the operator prompts (e.g., ventilation prescription examples) opens the fenestration assemblies 102 associated with the upper portions of the building and exhausts the accumulated warm air from the upper levels. The temperature in the upper levels of the building zone 1300, for instance including bedrooms, nurseries or the like, is rapidly decreased to facilitate rest for the occupants.

In another example, one or more moisture sensors 1214 are included with the fenestration assemblies 102 or are components of the ventilation modulating fenestration system 1200. In one example, the moisture sensors measure or detect precipitation (e.g., rain, snow or the like). A specified precipitation threshold (rain drops per unit time, inches of precipitation or the like) is a set point included with one example of a moisture based ventilation prescription. In a scenario including rain, snow or the like that exceeds the specified precipitation threshold the dynamic ventilation module automatically initiates closing of the fenestration assemblies 102 (e.g., optionally overriding other ongoing ventilation prescriptions) to prevent the ingress of moisture. In another example, the moisture sensors 1214 are used in combination with the ventilation prescription module 1214 to trigger opening, for instance, after cessation of precipitation. After the monitored precipitation falls beneath the specified precipitation threshold the dynamic ventilation module 1216 automatically opens the fenestration assemblies 102 in compliance with one or more ventilation prescriptions, such as ongoing prescriptions that were previously overridden because of precipitation.

VARIOUS NOTES AND ASPECTS

Aspect 1 can include subject matter such as a light modulating fenestration system comprising: a fenestration assembly configured for installation in a building, the fenestration assembly includes: a fenestration frame; a translucent panel housed within the fenestration frame; at least one light modulation element configured to modulate light from the fenestration assembly to a building interior; and a light modulation controller in communication with the at least one light modulation element, the light modulation controller includes: a period module configured to provide a specified light admission period for the building interior; a lighting difference module configured to determine a period difference between the specified light admission period and a natural light period; and a dynamic light module configured to operate the at least one light modulation element according to the determined period difference.

Aspect 2 can include, or can optionally be combined with the subject matter of Aspect 1, to optionally include at least one light sensor configured to measure the natural light period.

Aspect 3 can include, or can optionally be combined with the subject matter of one or any combination of Aspects 1 or 2 to optionally include wherein the dynamic light module is configured to operate the at least one light modulation element to generate light from the fenestration assembly if the specified light admission period is greater than the natural light period.

Aspect 4 can include, or can optionally be combined with the subject matter of one or any combination of Aspects 1-3 to optionally include wherein the dynamic light module is configured to operate the at least one light modulation element to throttle light from the fenestration assembly if the specified light admission period is less than the natural light period.

Aspect 5 can include, or can optionally be combined with the subject matter of one or any combination of Aspects 1-4 to optionally include wherein the at least one light modulation element includes at least one light-emitting diode (LED).

Aspect 6 can include, or can optionally be combined with the subject matter of Aspects 1-5 to optionally include wherein the light modulation element includes an array of light-emitting diodes (LEDs) coupled along the fenestration frame.

Aspect 7 can include, or can optionally be combined with the subject matter of Aspects 1-6 to optionally include wherein the at least one light modulation element includes at least one of an operable shade, operable screen, operable blind or operable louver.

Aspect 8 can include, or can optionally be combined with the subject matter of Aspects 1-7 to optionally include wherein the at least one light modulation element includes the translucent panel having operable tinting.

Aspect 9 can include, or can optionally be combined with the subject matter of Aspects 1-8 to optionally include wherein the operable tinting includes electrically operable tinting.

Aspect 10 can include, or can optionally be combined with the subject matter of Aspects 1-9 to optionally include wherein the period module configured to provide the specified light admission period includes the period module configured to provide at least one specified virtual day and night cycle.

Aspect 11 can include, or can optionally be combined with the subject matter of Aspects 1-10 to optionally include wherein the period module configured to provide the specified light admission period includes the period module configured to provide a plurality of specified virtual day and night cycles corresponding to a specified latitude.

Aspect 12 can include, or can optionally be combined with the subject matter of Aspects 1-11 to optionally include wherein the period module configured to provide the specified light admission period includes the period module configured to provide a plurality of specified virtual day and night cycles corresponding to a specified season.

Aspect 13 can include, or can optionally be combined with the subject matter of Aspects 1-12 to optionally include wherein the fenestration assembly includes a skylight fenestration assembly.

Aspect 14 can include, or can optionally be combined with the subject matter of Aspects 1-13 to optionally include a light modulating fenestration system comprising: a fenestration assembly configured for installation in a building, the fenestration assembly includes: a fenestration frame; a translucent panel housed within the fenestration frame; at least one light modulation element configured to modulate light from the fenestration assembly to a building interior; and a light modulation controller in communication with the at least one light modulation element, the light modulation controller includes: a light prescription module configured to provide at least one specified light prescription for the building interior; a lighting difference module configured to determine at least one prescription difference between the specified light prescription and ambient light; and a dynamic light module configured to operate the at least one light modulation element according to the determined at least one prescription difference.

Aspect 15 can include, or can optionally be combined with the subject matter of Aspects 1-14 to optionally include at least one light sensor in communication with the light modulation controller, and the at least one light sensor is configured to measure one or more ambient light characteristics.

Aspect 16 can include, or can optionally be combined with the subject matter of Aspects 1-15 to optionally include wherein the one or more ambient light characteristics include natural light period, natural light intensity, natural light temperature or color, natural light orientation, dawn period, dusk period, interior light intensity, interior light temperature or color, or interior light orientation.

Aspect 17 can include, or can optionally be combined with the subject matter of Aspects 1-16 to optionally include at least one interior light sensor in communication with the light modulation controller, and the at least one light sensor is configured to measure one or more ambient light characteristics of the building interior.

Aspect 18 can include, or can optionally be combined with the subject matter of Aspects 1-17 to optionally include wherein the dynamic light module is configured to operate the at least one light modulation element according to the determined at least one prescription difference and the one or more measured interior light characteristics.

Aspect 19 can include, or can optionally be combined with the subject matter of Aspects 1-18 to optionally include wherein the at least one light modulation element includes an adjustable light intensity characteristic and an adjustable light temperature characteristic; the lighting difference module is configured to determine a light intensity difference and a light temperature difference between the specified light prescription and ambient light; and the dynamic light module is configured to operate the at least one light modulation element according to the determined light intensity and light temperature differences.

Aspect 20 can include, or can optionally be combined with the subject matter of Aspects 1-19 to optionally include wherein the at least one light modulation element includes a plurality of lighting zones, and the dynamic light module is configured to independently operate the at least one light modulation element in each of the lighting zones.

Aspect 21 can include, or can optionally be combined with the subject matter of Aspects 1-20 to optionally include wherein the light prescription module includes an orientation module, and the orientation module is configured to provide an orientation of light as at least one component of the specified light prescription; and the dynamic light module is configured to independently operate the at least one light modulation element in each of the light zones to provide the orientation of light.

Aspect 22 can include, or can optionally be combined with the subject matter of Aspects 1-21 to optionally include wherein the orientation of light component of the specified light prescription includes a virtual solar transit scheme; and the dynamic light module is configured to independently operate the at least one light modulation element in each of the light zones to provide the virtual solar transit scheme.

Aspect 23 can include, or can optionally be combined with the subject matter of Aspects 1-22 to optionally include wherein the at least one light modulating element includes one or more of a light generating element or a light throttling element.

Aspect 24 can include, or can optionally be combined with the subject matter of Aspects 1-23 to optionally include wherein the light generating element includes: an array of light generating elements provided along an interior channel of the fenestration frame in communication with a light shaft extending through the fenestration frame; and an operable shade coupled with the fenestration frame, the operable shade is configured for movement between stored and deployed configurations.

Aspect 25 can include, or can optionally be combined with the subject matter of Aspects 1-24 to optionally include wherein the fenestration assembly includes a skylight fenestration assembly.

Aspect 26 can include, or can optionally be combined with the subject matter of Aspects 1-25 to optionally include a ventilation modulating fenestration system comprising: a fenestration assembly configured for installation in a building, the fenestration assembly includes: a fenestration frame having a frame profile surrounding a light shaft; and a translucent panel movably coupled with the fenestration frame, the translucent panel includes a light opening profile surrounding the light shaft; an operator coupled between the fenestration frame and the translucent panel, the operator is configured to transition the translucent panel between open and closed positions; and a concealed screen assembly coupled between the fenestration frame and the translucent panel, the concealed screen assembly includes: a screen membrane coupled with at least one of the fenestration frame or the translucent panel, the screen membrane envelops a continuous ventilation perimeter opening between the translucent panel and the fenestration frame; and wherein the screen membrane is offset from the light shaft.

Aspect 27 can include, or can optionally be combined with the subject matter of Aspects 1-26 to optionally include wherein the continuous ventilation perimeter opening extends along each side of each of the fenestration frame and the translucent panel with the translucent panel in the open position.

Aspect 28 can include, or can optionally be combined with the subject matter of Aspects 1-27 to optionally include wherein the concealed screen assembly includes stored and deployed configurations: in the deployed configuration the screen membrane spans the continuous perimeter ventilation opening between the fenestration frame and the translucent panel; and in the stored configuration the screen membrane is retained within a screen housing outside of the light shaft.

Aspect 29 can include, or can optionally be combined with the subject matter of Aspects 1-28 to optionally include wherein at least the screen membrane is offset from the light shaft in each of the deployed and stored configurations.

Aspect 30 can include, or can optionally be combined with the subject matter of Aspects 1-29 to optionally include wherein the screen membrane offset from the light shaft includes the screen membrane is outside of the light opening profile of the translucent panel and the frame profile of the fenestration frame.

Aspect 31 can include, or can optionally be combined with the subject matter of Aspects 1-30 to optionally include wherein the light shaft includes a light shaft profile of a rough opening frame, and each of the light opening profile of the translucent panel and the frame profile of the fenestration frame are flush with or recessed from the light shaft profile.

Aspect 32 can include, or can optionally be combined with the subject matter of Aspects 1-31 to optionally include wherein the screen membrane includes a pliable screen membrane configured to pleat in a stored configuration and unfold in a deployed configuration.

Aspect 33 can include, or can optionally be combined with the subject matter of Aspects 1-32 to optionally include wherein the concealed screen assembly includes at least one pleat guide configured to bias the pliable screen membrane to pleat in at least the stored configuration.

Aspect 34 can include, or can optionally be combined with the subject matter of Aspects 1-33 to optionally include wherein the concealed screen assembly includes a retention cage proximate to the screen membrane, and the retention cage is configured to brace the screen membrane.

Aspect 35 can include, or can optionally be combined with the subject matter of Aspects 1-34 to optionally include wherein the retention cage includes one or more deflectable tendons coupled between the fenestration frame and the translucent panel.

Aspect 36 can include, or can optionally be combined with the subject matter of Aspects 1-35 to optionally include wherein the retention cage includes one or more struts coupled with one or more of the fenestration frame or the translucent panel.

Aspect 37 can include, or can optionally be combined with the subject matter of Aspects 1-36 to optionally include wherein the screen membrane is interposed between the operator proximate an interior of the fenestration assembly and the retention cage proximate an exterior of the fenestration assembly.

Aspect 38 can include, or can optionally be combined with the subject matter of Aspects 1-37 to optionally include wherein the operator includes a first operator proximate a first side jamb of the fenestration assembly and a second operator proximate a second side jamb of the fenestration assembly; and the first and second operators are configured to transition the translucent panel to the open position wherein the translucent panel is remote from the fenestration frame with the continuous ventilation perimeter opening therebetween.

Aspect 39 can include, or can optionally be combined with the subject matter of Aspects 1-38 to optionally include wherein the translucent panel is parallel to the fenestration frame in the open position.

Aspect 40 can include, or can optionally be combined with the subject matter of Aspects 1-39 to optionally include wherein the operator includes: an operator mechanism coupled between the fenestration frame and the translucent panel; an operator actuator coupled with the operator mechanism; and a guide linkage coupled between the fenestration frame and the translucent panel.

Aspect 41 can include, or can optionally be combined with the subject matter of Aspects 1-40 to optionally include wherein the guide linkage is configured to guide movement of the translucent panel between the open and closed positions and maintain the translucent panel parallel to the fenestration frame.

Aspect 42 can include, or can optionally be combined with the subject matter of Aspects 1-41 to optionally include wherein the fenestration assembly includes a skylight fenestration assembly.

Aspect 43 can include, or can optionally be combined with the subject matter of Aspects 1-42 to optionally include a ventilation modulating fenestration system comprising: a fenestration assembly configured for installation in a building, the fenestration assembly includes: a fenestration frame; and a translucent panel movably coupled with the fenestration frame; an operator coupled between the fenestration frame and the translucent panel, the operator is configured to transition the translucent panel between open and closed positions; and a ventilation modulation controller in communication with the operator, the ventilation modulation controller includes: a ventilation prescription module configured to provide at least one specified ventilation prescription for the building interior; and a dynamic ventilation module configured to implement closing and opening of the translucent panel according to the at least one specified ventilation prescription.

Aspect 44 can include, or can optionally be combined with the subject matter of Aspects 1-43 to optionally include wherein the ventilation prescription module includes the at least one specified ventilation prescription including one or more of a specified ventilation opening, a specified ventilation period, a specified ventilation trigger condition, or a specified ventilation cessation condition.

Aspect 45 can include, or can optionally be combined with the subject matter of Aspects 1-44 to optionally include wherein the ventilation modulation controller includes a coordination module configured to receive characteristics of one or more of the fenestration assembly, a supplemental fenestration assembly, a home automation device, a fenestration sensor, an environmental conditioning unit, a building sensor, or a security system.

Aspect 46 can include, or can optionally be combined with the subject matter of Aspects 1-45 to optionally include wherein the coordination module is in communication with each of the fenestration assembly and the supplemental fenestration assembly; and the dynamic ventilation module is configured to implement opening of the translucent panel of the fenestration assembly with opening of a sash of the supplemental fenestration assembly.

Aspect 47 can include, or can optionally be combined with the subject matter of Aspects 1-46 to optionally include wherein the fenestration assembly includes a skylight fenestration assembly.

Aspect 48 can include, or can optionally be combined with the subject matter of Aspects 1-47 to optionally include a concealed screen assembly coupled between the fenestration frame and the translucent panel, the concealed screen assembly includes: a screen membrane coupled with at least one of the fenestration frame or the translucent panel, the screen membrane envelops a continuous ventilation perimeter opening between the translucent panel and the fenestration frame.

Aspect 49 can include, or can optionally be combined with the subject matter of Aspects 1-48 to optionally include a method for modulating light with a fenestration system comprising: receiving at least one ambient light characteristic of ambient light; modulating light within a building according to the at least one sensed ambient light characteristic with a fenestration assembly, modulating light includes: determining a prescription difference between a specified light prescription and the sensed ambient light characteristic; and operating at least one light modulation element associated with the fenestration assembly according to the determined prescription difference to achieve the specified light prescription, the fenestration assembly having a fenestration frame and a translucent panel housed with the fenestration frame.

Aspect 50 can include, or can optionally be combined with the subject matter of Aspects 1-49 to optionally include wherein receiving the at least one ambient light characteristic includes receiving one or more of natural light period, natural light intensity, natural light temperature or color, natural light orientation, dawn period, dusk period, interior light intensity, interior light temperature or color, or interior light orientation.

Aspect 51 can include, or can optionally be combined with the subject matter of Aspects 1-50 to optionally include wherein receiving the at least one ambient light characteristic includes receiving at least one ambient light characteristic of a building interior.

Aspect 52 can include, or can optionally be combined with the subject matter of Aspects 1-51 to optionally include wherein receiving the at least one ambient light characteristic includes sensing the at least one ambient light characteristic of ambient light.

Aspect 53 can include, or can optionally be combined with the subject matter of Aspects 1-52 to optionally include wherein the at least one ambient light characteristic of ambient light includes one or more of an interior light intensity or an interior light temperature; and the specified light prescription includes one or more of a specified light intensity or a specified light temperature; and determining the prescription difference includes one or more of: determining a light intensity difference between an interior light intensity and the specified light intensity; or determining a light temperature difference between an interior light temperature and the specified light temperature.

Aspect 54 can include, or can optionally be combined with the subject matter of Aspects 1-53 to optionally include wherein operating the at least one light modulation element includes supplementing the ambient light or throttling the ambient light to achieve one or more of the specified light intensity or the specified light temperature.

Aspect 55 can include, or can optionally be combined with the subject matter of Aspects 1-54 to optionally include wherein the at least one light modulation element includes at least one light generating element; and operating the at least one light modulation element according to the determined prescription difference includes generating supplemental light, with the at least one light generating element, proportional to the prescription difference to achieve the specified light prescription.

Aspect 56 can include, or can optionally be combined with the subject matter of Aspects 1-55 to optionally include wherein the specified light prescription includes a specified virtual day and night cycle, and the at least one light modulation element includes one or more of a light generating element or a light throttling element; and operating the at least one light modulation element according to the determined prescription difference includes generating supplemental light with the light generating element or throttling natural light with the light throttling element to achieve the specified virtual day and night cycle.

Aspect 57 can include, or can optionally be combined with the subject matter of Aspects 1-56 to optionally include wherein the specified light prescription includes a specified virtual solar transit scheme; and the at least one light modulation element includes at least first and second light modulation elements; and operating the at least one light modulation element according to the determined prescription difference includes independently operating the first and second light modulation elements to achieve the specified virtual solar transit.

Aspect 58 can include, or can optionally be combined with the subject matter of Aspects 1-57 to optionally include wherein the at least one light modulation element includes at least one operable shade; and operating the at least one light modulation element according to the determined prescription difference includes throttling natural light through the fenestration assembly, with the at least one operable shade, proportional to the prescription difference to achieve the specified light prescription.

Aspect 59 can include, or can optionally be combined with the subject matter of Aspects 1-58 to optionally include wherein the at least one light modulation element includes electrically operable tinting; and operating the at least one light modulation element according to the determined prescription difference includes throttling natural light through the fenestration assembly, with the electrically operable tinting, proportional to the prescription difference to achieve the specified light prescription.

Aspect 60 can include, or can optionally be combined with the subject matter of Aspects 1-59 to optionally include a method for modulating ventilation with a fenestration system comprising: receiving at least one specified ventilation prescription; receiving at least one environmental characteristic; and modulating ventilation within a building according to the at least one specified ventilation prescription with a fenestration assembly, modulating light includes: opening a translucent panel of the fenestration assembly according to one or more of the specified ventilation prescription or the environmental characteristic; and closing the translucent panel according to one or more of the specified ventilation prescription or the environmental characteristic.

Aspect 61 can include, or can optionally be combined with the subject matter of Aspects 1-60 to optionally include wherein receiving the at least one specified ventilation prescription includes receiving a specified ventilation cycle.

Aspect 62 can include, or can optionally be combined with the subject matter of Aspects 1-61 to optionally include wherein receiving the at least one environmental characteristic includes receiving one or more of an exterior temperature, an exterior moisture characteristic, an exterior air quality, a wind characteristic, an interior temperature, an interior moisture characteristic, an interior air quality, an opening status of a supplemental fenestration assembly, operating status of one or more environmental conditioning units.

Aspect 63 can include, or can optionally be combined with the subject matter of Aspects 1-62 to optionally include wherein receiving the at least one specified ventilation prescription includes receiving a specified ventilation prescription having one or more environmental characteristic thresholds related to the received at least one environmental characteristic; and opening and closing the translucent panel includes opening and closing the translucent panel according to the meeting of the one or more environmental characteristic thresholds with the received at least one environmental characteristic.

Aspect 64 can include, or can optionally be combined with the subject matter of Aspects 1-63 to optionally include wherein modulating ventilation within the building according to the at least one specified ventilation prescription includes: determining a difference between an interior temperature and an exterior temperature; and opening or closing the translucent panel according to the difference.

Aspect 65 can include, or can optionally be combined with the subject matter of Aspects 1-64 to optionally include wherein modulating ventilation within the building according to the at least one specified ventilation prescription includes: receiving the at least one environmental characteristic including an exterior moisture characteristic or a wind characteristic; and opening or closing the translucent panel according to meeting of an exterior moisture threshold or a wind threshold.

Aspect 66 can include, or can optionally be combined with the subject matter of Aspects 1-65 to optionally include wherein closing the translucent panel includes closing the translucent panel of the fenestration assembly according to an exterior moisture characteristic including precipitation.

Aspect 67 can include, or can optionally be combined with the subject matter of Aspects 1-66 to optionally include wherein modulating ventilation within the building includes: coordinating opening or closing of the translucent panel with one or more of operation of an environmental conditioning unit or opening or closing of a supplemental fenestration assembly.

Aspect 68 can include, or can optionally be combined with the subject matter of Aspects 1-67 to optionally include wherein coordinating opening or closing of the translucent panel includes: receiving the open or closed status of the supplemental fenestration assembly; opening the translucent panel of the fenestration assembly according to the open status of the supplemental fenestration assembly; and closing the translucent panel of the fenestration assembly according to the closed status of the supplemental fenestration assembly.

Aspect 69 can include, or can optionally be combined with the subject matter of Aspects 1-68 to optionally include wherein coordinating opening or closing of the translucent panel includes: receiving the operation status of an environmental conditioning unit; opening the translucent panel of the fenestration assembly according to a first operation status of the environmental conditioning unit; and closing the translucent panel of the fenestration assembly according to a different second operation status of the environmental conditioning unit.

Aspect 70 can include, or can optionally be combined with the subject matter of Aspects 1-69 to optionally include wherein the first operation status includes operation of the environmental conditioning unit and the second operation status includes cessation of operation of the environmental conditioning unit.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A ventilation modulating fenestration system comprising:
 a fenestration assembly configured for installation in a building, the fenestration assembly includes:
 a fenestration frame having a frame profile surrounding a light shaft; and
 a translucent panel movably coupled with the fenestration frame between open and closed positions, the translucent panel includes a light opening profile surrounding the light shaft;
 an operator coupled between the fenestration frame and the translucent panel, the operator is configured to transition the translucent panel between the open and closed positions;
 wherein the open position includes the translucent panel projected beyond the fenestration frame and disengaged from the fenestration frame; and
 a concealed screen assembly coupled between the fenestration frame and the translucent panel, the concealed screen assembly includes:
 a screen membrane engaged along the translucent panel, the screen membrane extending from the translucent panel toward the fenestration frame, the screen membrane envelops a continuous ventilation perimeter opening between the translucent panel and the fenestration frame; and
 wherein the screen membrane is offset from the light shaft.

2. The ventilation modulating fenestration system of claim 1, wherein the continuous ventilation perimeter opening extends along each side of each of the fenestration frame and the translucent panel with the translucent panel in the open position.

3. The ventilation modulating fenestration system of claim 1, wherein the concealed screen assembly includes stored and deployed configurations:
 in the deployed configuration the screen membrane spans the continuous perimeter ventilation opening between the fenestration frame and the translucent panel; and
 in the stored configuration the screen membrane is retained within a screen housing outside of the light shaft.

4. The ventilation modulating fenestration system of claim 3, wherein at least the screen membrane is offset from the light shaft in each of the deployed and stored configurations.

5. The ventilation modulating fenestration system of claim 4, wherein the screen membrane offset from the light shaft includes the screen membrane is outside of the light opening profile of the translucent panel and the frame profile of the fenestration frame.

6. The ventilation modulating fenestration system of claim 1, wherein the light shaft includes a light shaft profile of a rough opening frame, and each of the light opening profile of the translucent panel and the frame profile of the fenestration frame are flush with or recessed from the light shaft profile.

7. The ventilation modulating fenestration system of claim 1, wherein the screen membrane includes a pliable screen membrane configured to pleat in a stored configuration and unfold in a deployed configuration.

8. The ventilation modulating fenestration system of claim 7, wherein the concealed screen assembly includes at least one pleat guide configured to bias the pliable screen membrane to pleat in at least the stored configuration.

9. The ventilation modulating fenestration system of claim 1, wherein the concealed screen assembly includes a retention cage proximate to the screen membrane, and the retention cage is configured to brace the screen membrane.

10. The ventilation modulating fenestration system of claim 9, wherein the retention cage includes one or more deflectable tendons coupled between the fenestration frame and the translucent panel.

11. The ventilation modulating fenestration system of claim 9, wherein the retention cage includes one or more struts coupled with one or more of the fenestration frame or the translucent panel.

12. The ventilation modulating fenestration system of claim 1, wherein the operator includes a first operator proximate a first side jamb of the fenestration assembly and a second operator proximate a second side jamb of the fenestration assembly; and
 the first and second operators are configured to transition the translucent panel to the open position wherein the translucent panel is remote from the fenestration frame with the continuous ventilation perimeter opening therebetween.

13. The ventilation modulating fenestration system of claim 1, wherein the translucent panel is parallel to the fenestration frame in the open position.

14. The ventilation modulating fenestration system of claim 1, wherein the operator includes:
   an operator mechanism coupled between the fenestration frame and the translucent panel;
   an operator actuator coupled with the operator mechanism; and
   a guide linkage coupled between the fenestration frame and the translucent panel.

15. The ventilation modulating fenestration system of claim 1, wherein the fenestration assembly includes a skylight fenestration assembly.

16. The ventilation modulating fenestration system of claim 9, wherein the screen membrane is interposed between the operator proximate an interior of the fenestration assembly and the retention cage proximate an exterior of the fenestration assembly.

17. The ventilation modulating fenestration system of claim 14, wherein the guide linkage is configured to guide movement of the translucent panel between the open and closed positions and maintain the translucent panel parallel to the fenestration frame.

18. The ventilation modulating fenestration system of claim 1, wherein in the open position the screen membrane spans the continuous ventilation perimeter opening between the translucent panel and the fenestration frame.

\* \* \* \* \*